(12) United States Patent
Steffensen

(10) Patent No.: US 8,875,408 B2
(45) Date of Patent: Nov. 4, 2014

(54) MEASURING STAFF

(75) Inventor: Bevan Gordon Steffensen, Gold Coast (AU)

(73) Assignee: Steffco Pty Ltd, Robina (AU)

( * ) Notice: Subject to any disclaimer, the term of this patent is extended or adjusted under 35 U.S.C. 154(b) by 344 days.

(21) Appl. No.: 13/482,201

(22) Filed: May 29, 2012

(65) Prior Publication Data

US 2013/0133214 A1 May 30, 2013

Related U.S. Application Data

(63) Continuation-in-part of application No. 12/672,304, filed as application No. PCT/AU2008/001094 on Jul. 30, 2008, now Pat. No. 8,201,340.

(30) Foreign Application Priority Data

Aug. 6, 2007 (AU) ................. 2007904185
Sep. 4, 2007 (AU) ................. 2007100847

(51) Int. Cl.
*G01C 15/06* (2006.01)
*G01C 9/02* (2006.01)

(52) U.S. Cl.
CPC . *G01C 9/02* (2013.01); *G01C 15/06* (2013.01)
USPC .............................................. 33/296; 33/809

(58) Field of Classification Search
USPC .......................................... 33/293–296, 809
See application file for complete search history.

(56) References Cited

U.S. PATENT DOCUMENTS

| | | | |
|---|---|---|---|
| 739,035 A | 9/1903 | Triner | |
| 3,492,729 A * | 2/1970 | Crain ............................. | 33/296 |
| 4,060,909 A | 12/1977 | Collins | |
| 4,318,228 A | 3/1982 | Kimura | |
| 4,621,431 A | 11/1986 | Fatool et al. | |
| 4,662,077 A | 5/1987 | Richards | |
| 4,899,452 A | 2/1990 | Schafer | |
| 5,038,493 A * | 8/1991 | Stabs ............................. | 33/809 |
| 5,317,813 A * | 6/1994 | Reed ............................. | 33/809 |
| 5,414,942 A | 5/1995 | Moore et al. | |
| 5,566,460 A * | 10/1996 | Bates ............................. | 33/296 |
| 5,687,486 A | 11/1997 | Foltz | |
| 6,076,267 A * | 6/2000 | Gotoh ............................. | 33/293 |
| 6,166,802 A * | 12/2000 | Kodaira et al. .................. | 33/293 |
| 6,209,210 B1 | 4/2001 | Stout | |
| 6,508,006 B1 | 1/2003 | Black | |
| 6,584,697 B1 | 7/2003 | Guoan | |
| 7,251,899 B2 * | 8/2007 | Yandrick et al. ................ | 33/294 |
| 7,257,903 B2 | 8/2007 | Lee | |
| 7,448,138 B1 | 11/2008 | Vanneman | |
| 8,572,856 B1 * | 11/2013 | Vannoy et al. .................. | 33/296 |

(Continued)

*Primary Examiner* — G. Bradley Bennett
(74) *Attorney, Agent, or Firm* — Shoemaker and Mattare

(57) ABSTRACT

A measuring staff (10) has a upper section (11) including a first elongated member (12) which can carry in a fixed position therealong a laser detector of a laser leveling system or a sighting marker of an optical measuring system, and a second elongated member (13) telescopically extendable and retractable relative to the first member (12), a graduated scale (18) on the first member (13) and a pointer (17) on the second member which indicates the extension or retraction of the second member (13) relative to the first member (12), a spring (20) for urging the second member (13) outwardly from the first member (11), the second member (13) being selectively lockable to the first member, and an extension section (14,15) at the lower end of the upper section and extendable therefrom.

23 Claims, 32 Drawing Sheets

(56) References Cited

U.S. PATENT DOCUMENTS

2006/0201008 A1* 9/2006 Yandrick et al. ............... 33/294

2008/0256812 A1 10/2008 Yandrick et al.
2009/0235543 A1 9/2009 Hayashi et al.
2012/0186090 A1* 7/2012 Ward ............................. 33/293

* cited by examiner

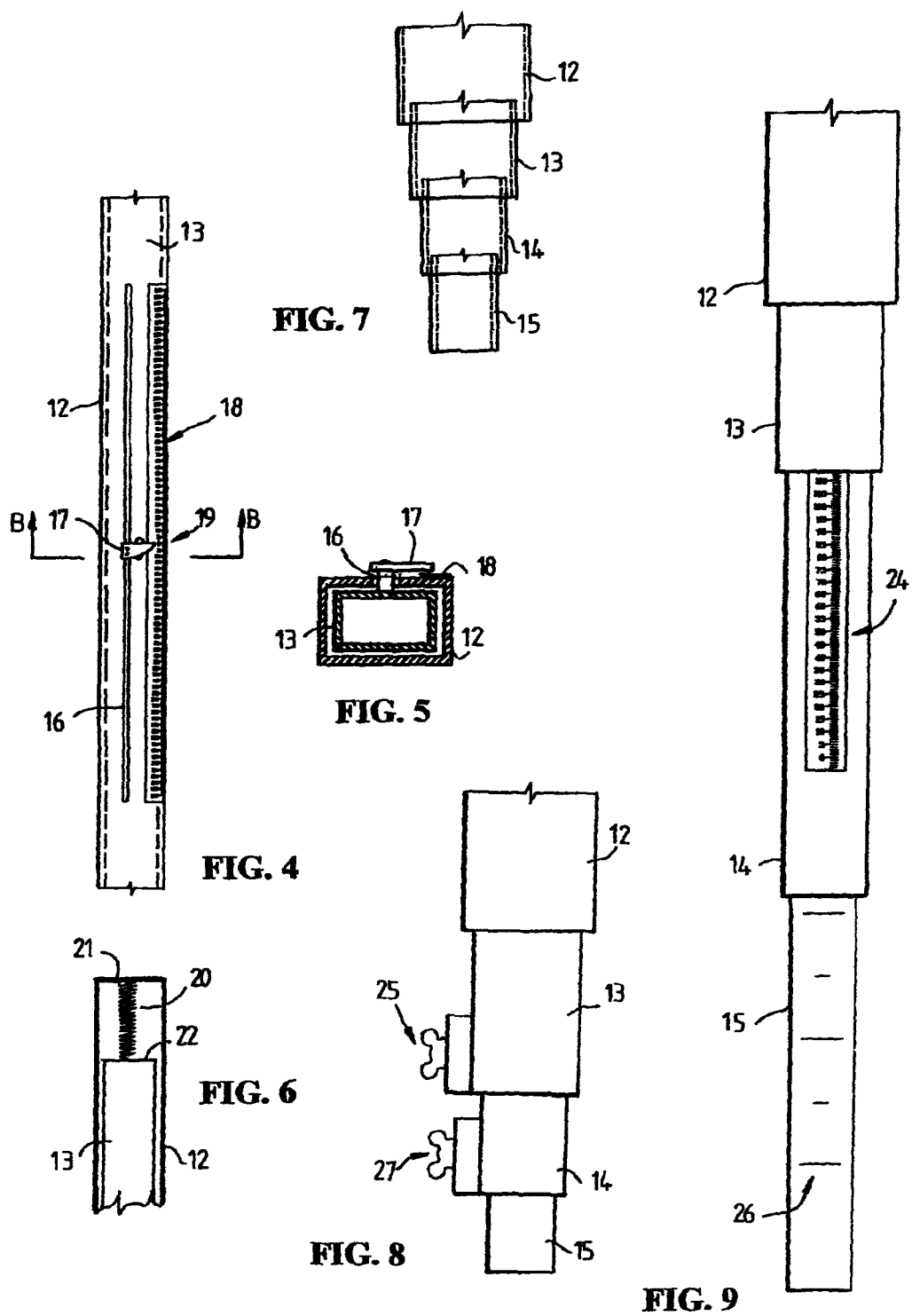

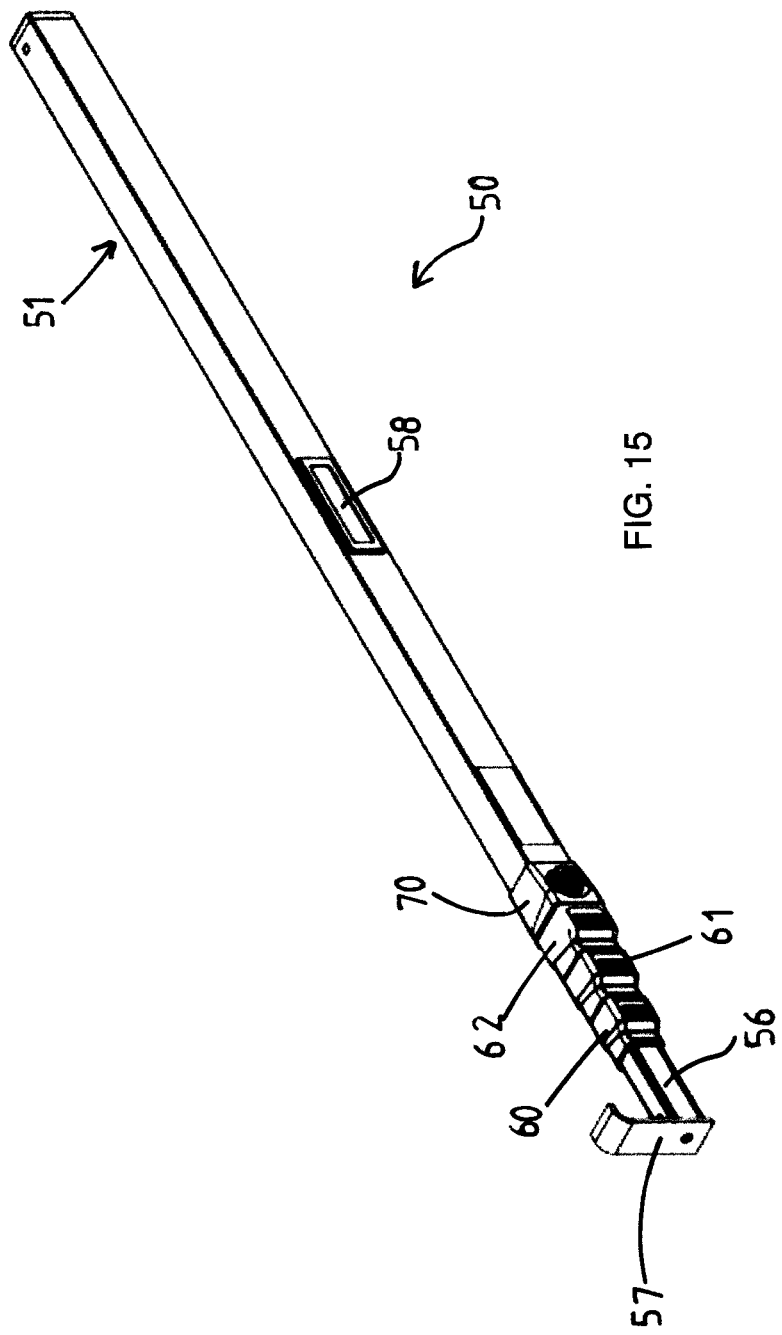

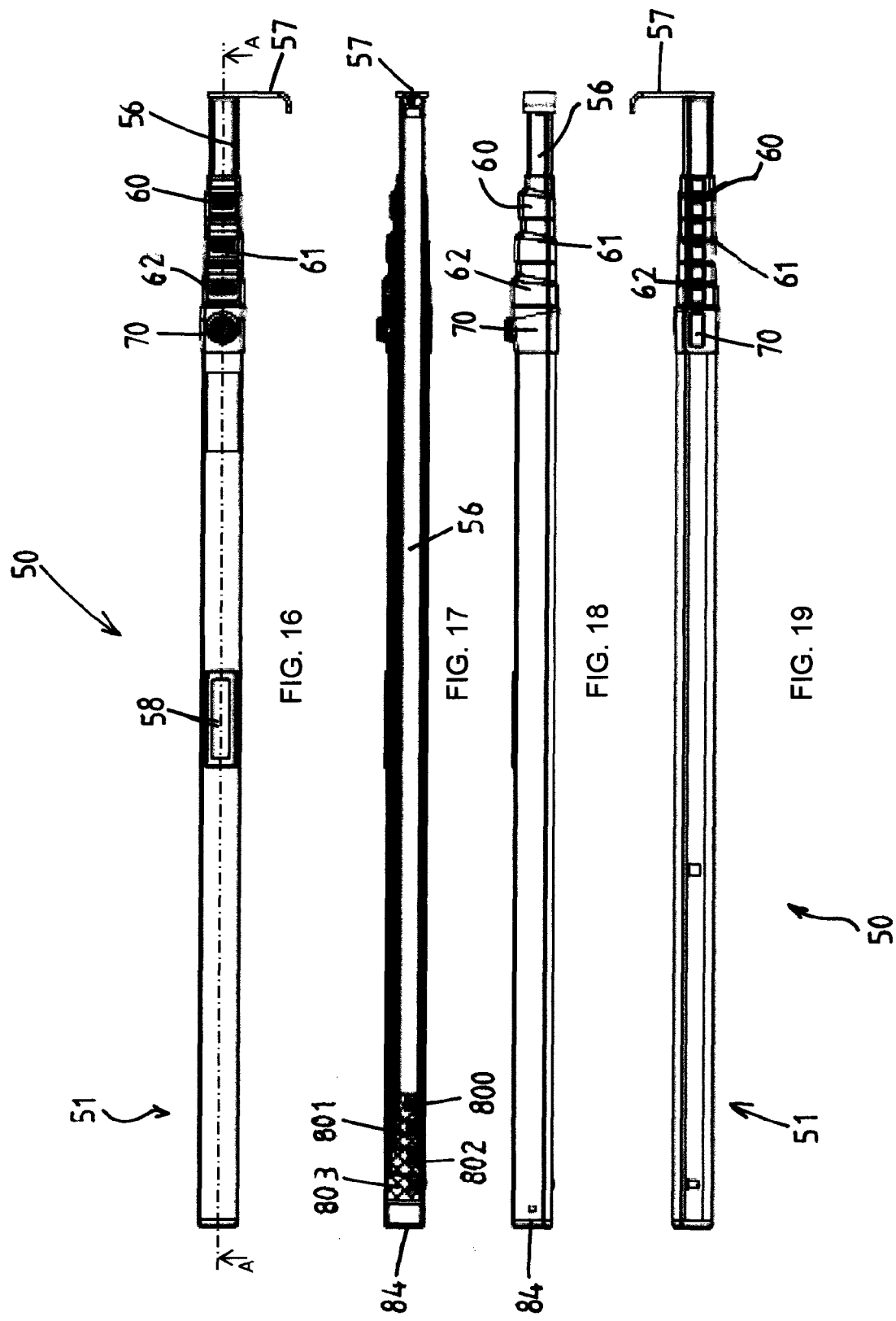

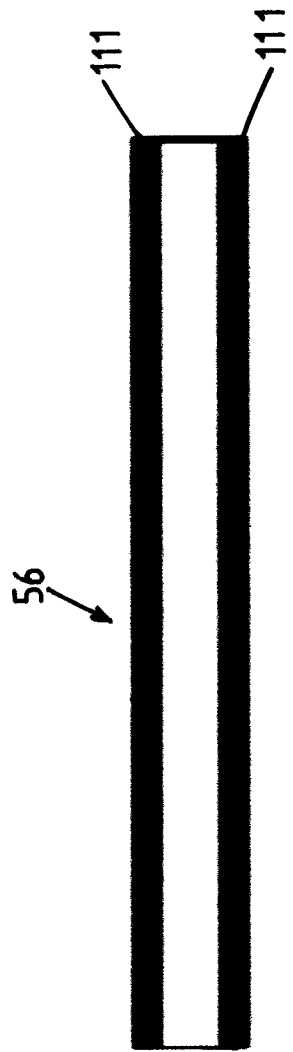
FIG. 23
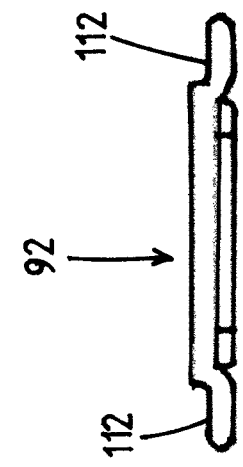
FIG. 25
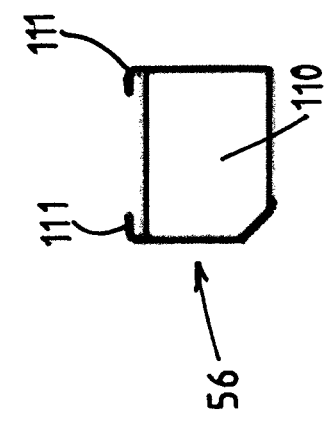
FIG. 24
FIG. 22

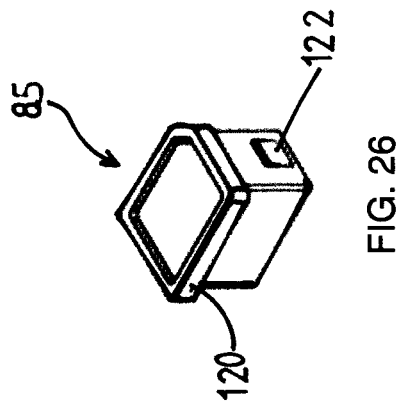
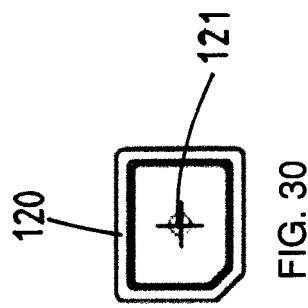
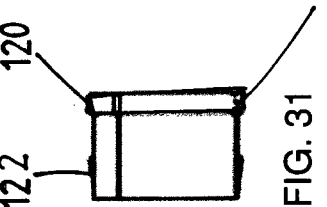
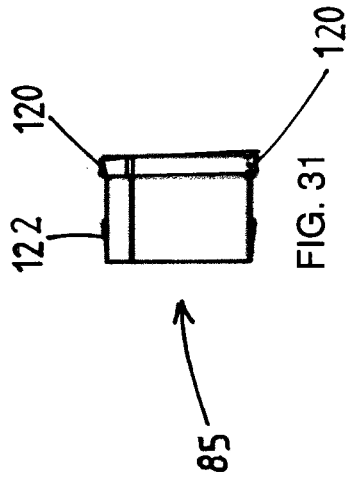
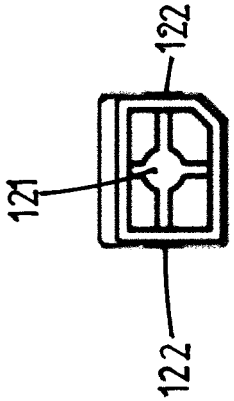

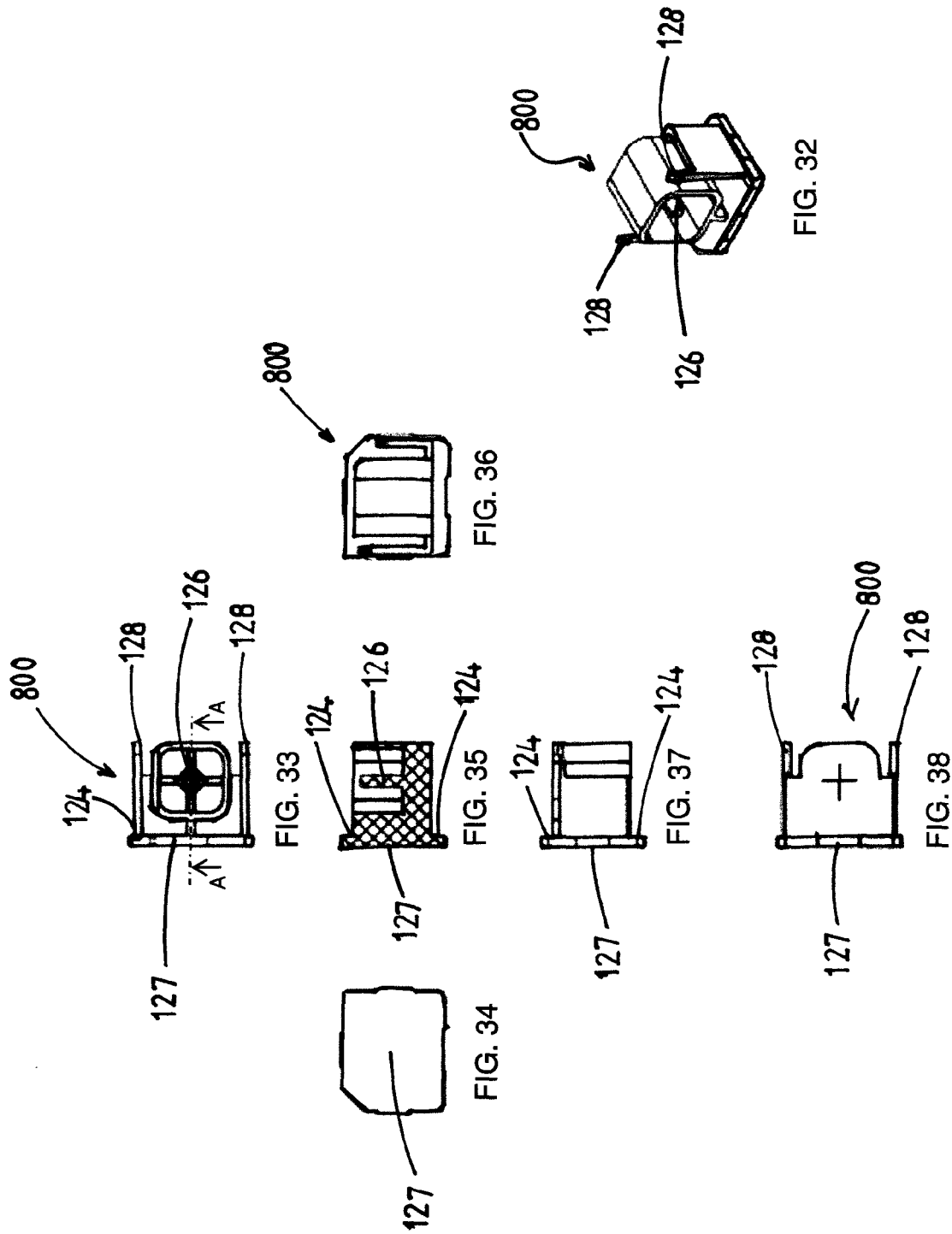

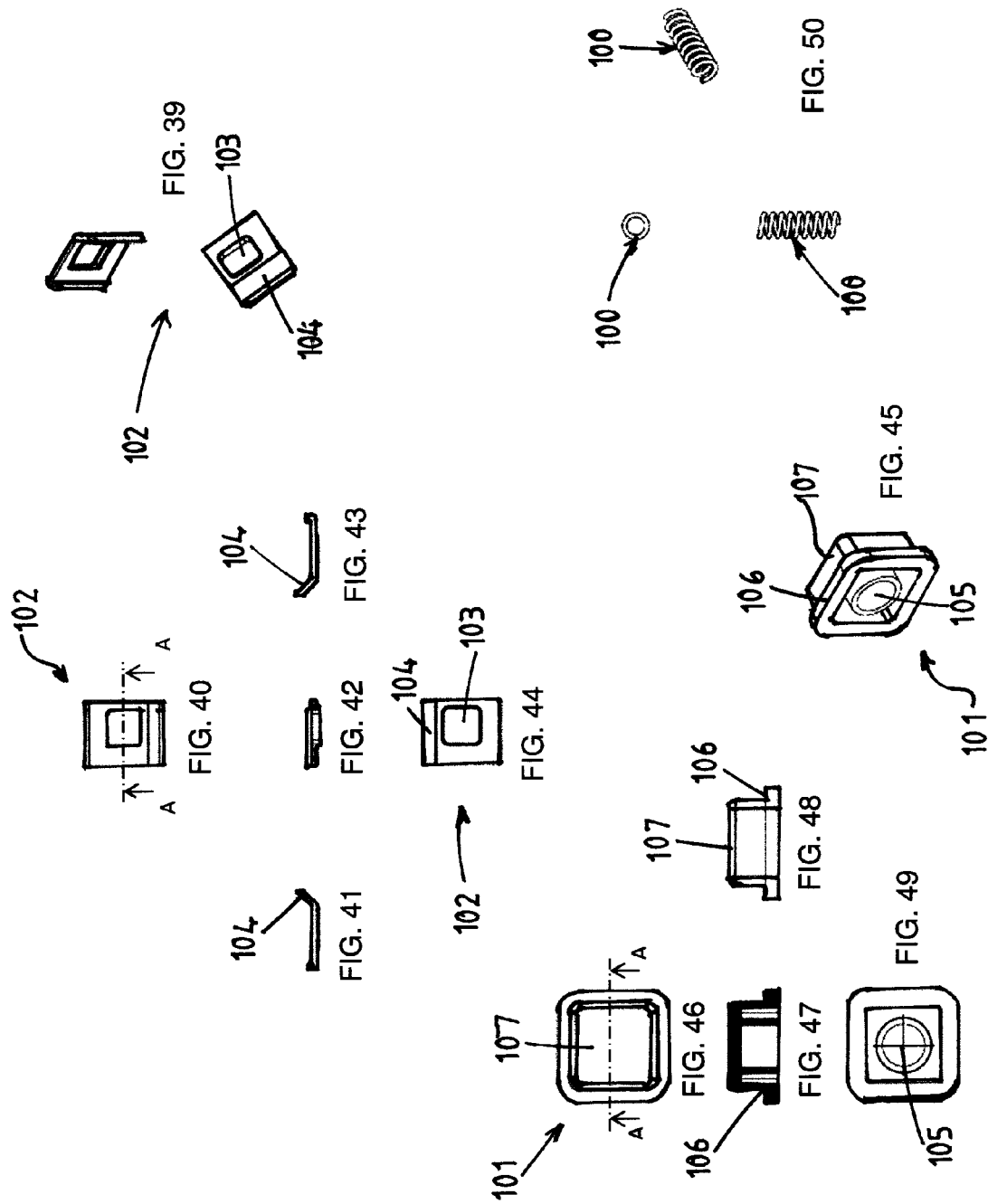

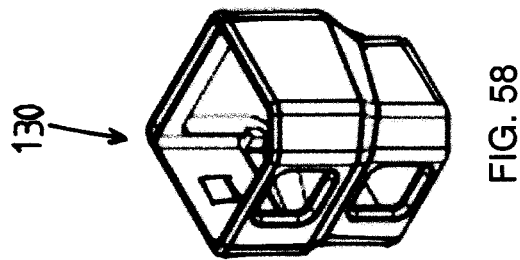
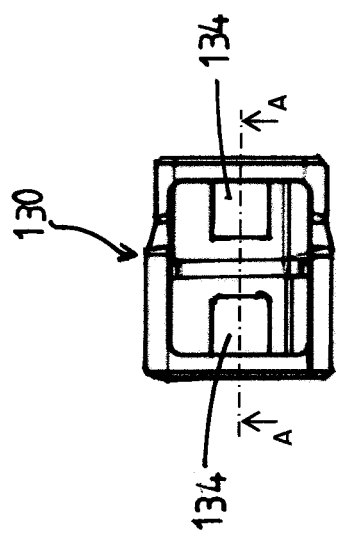
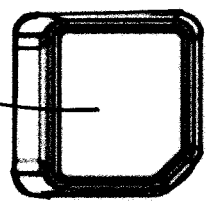
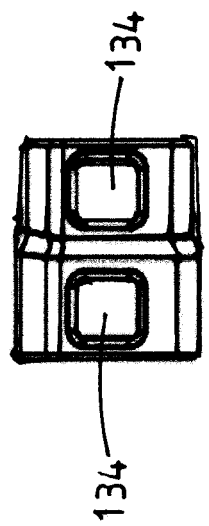
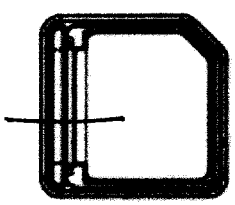

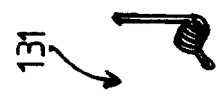
FIG. 70
FIG. 71
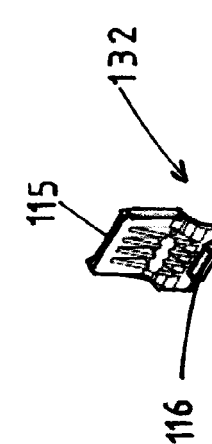
FIG. 64
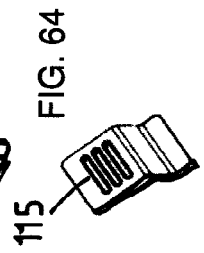
FIG. 69
FIG. 65
FIG. 66
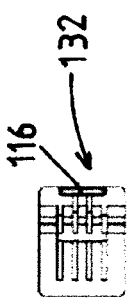
FIG. 67
FIG. 68

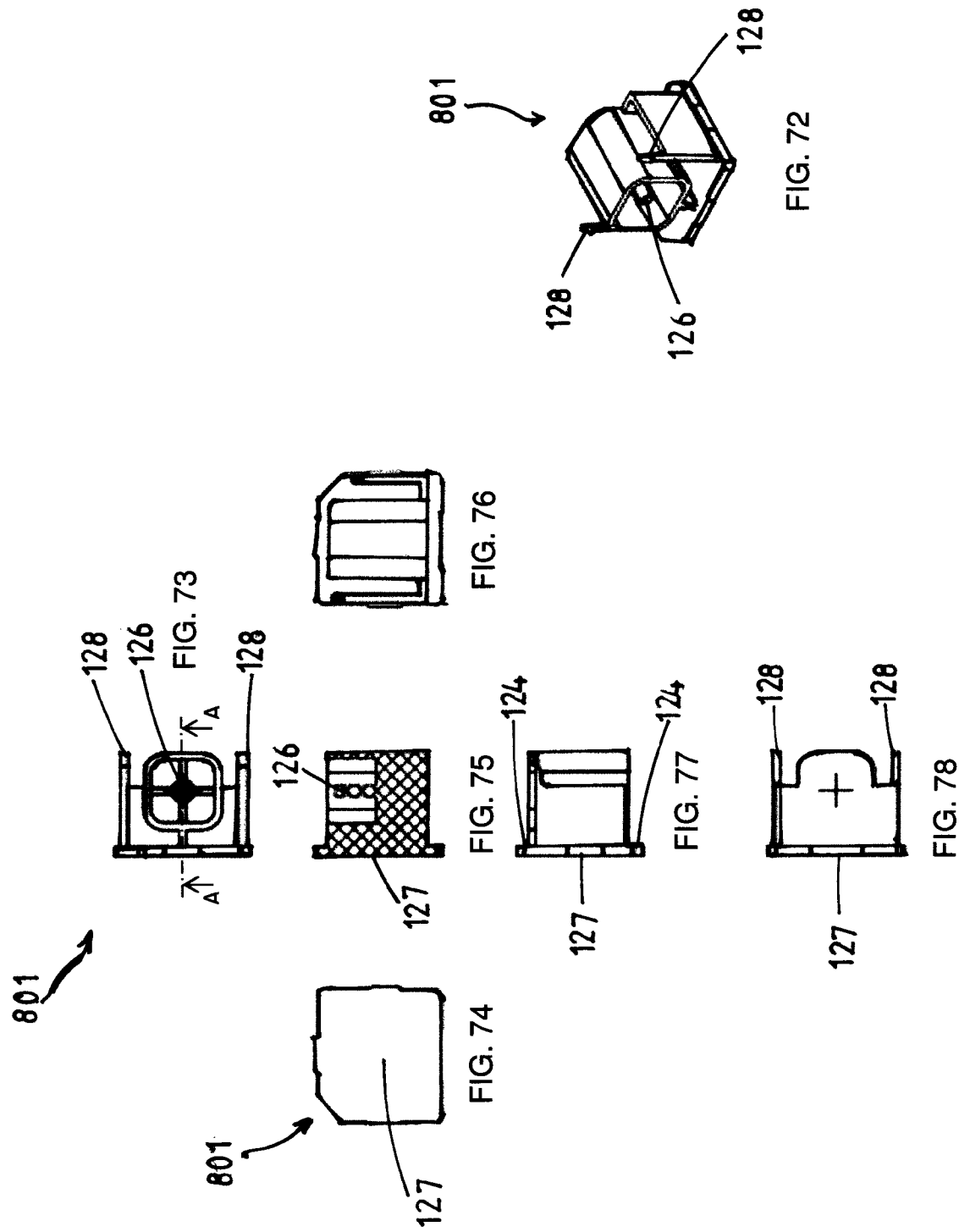

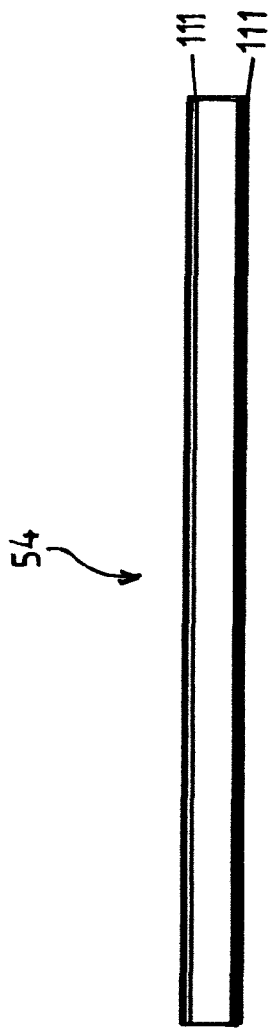
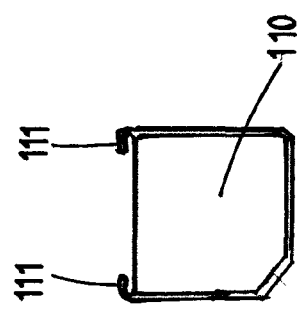
FIG. 80
FIG. 81
FIG. 82
FIG. 83

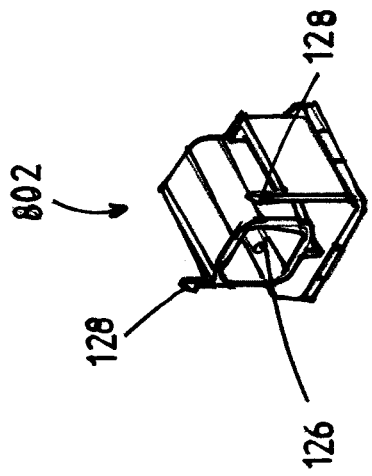
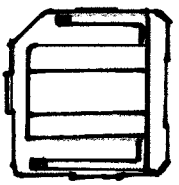
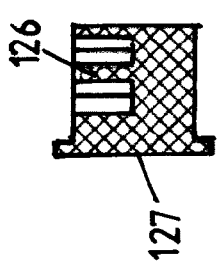
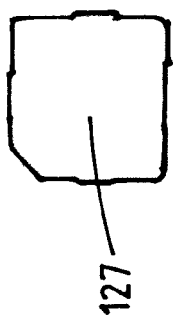
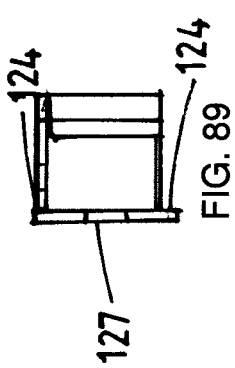
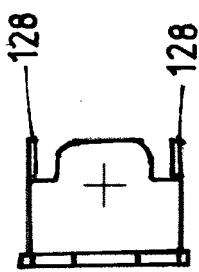

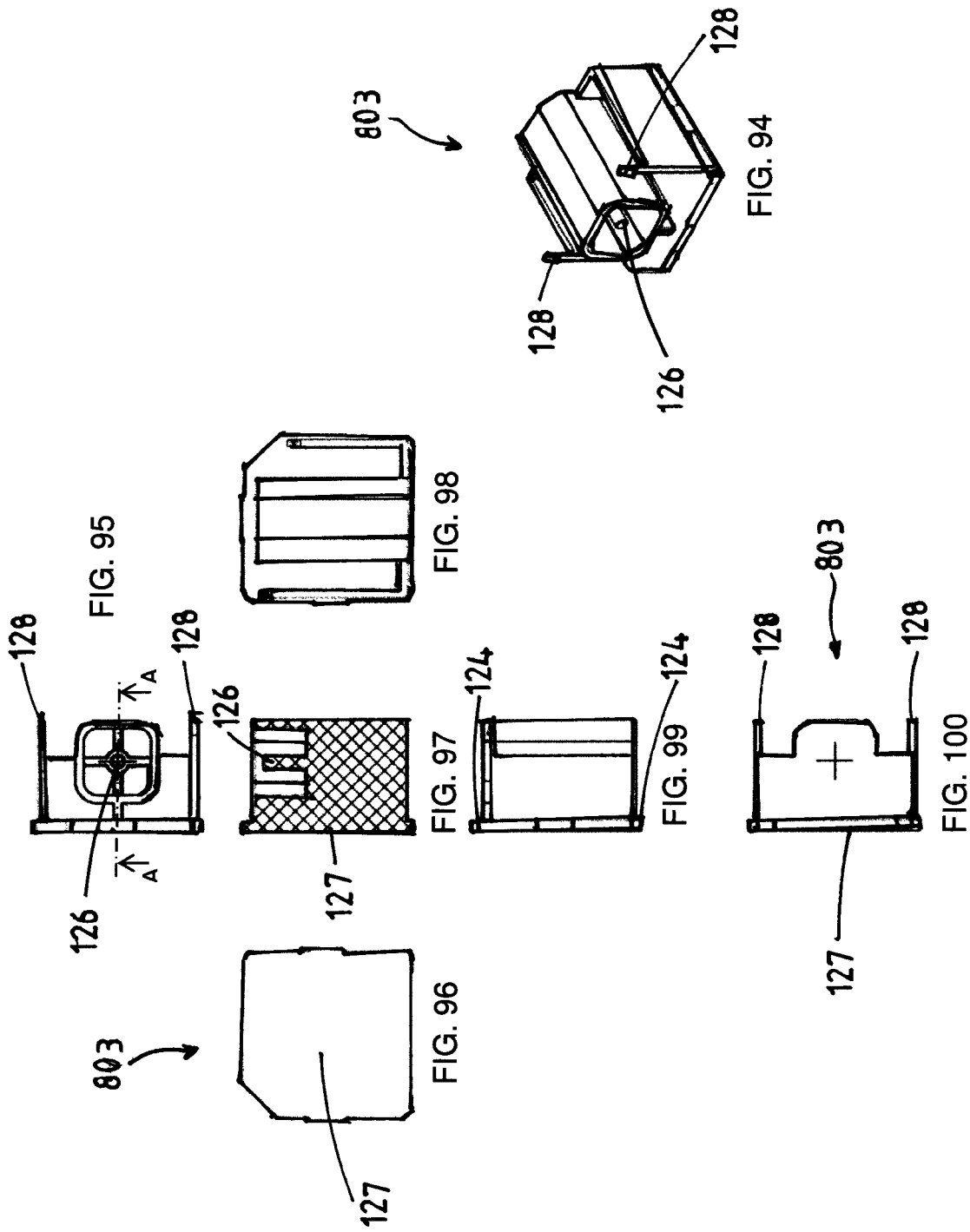

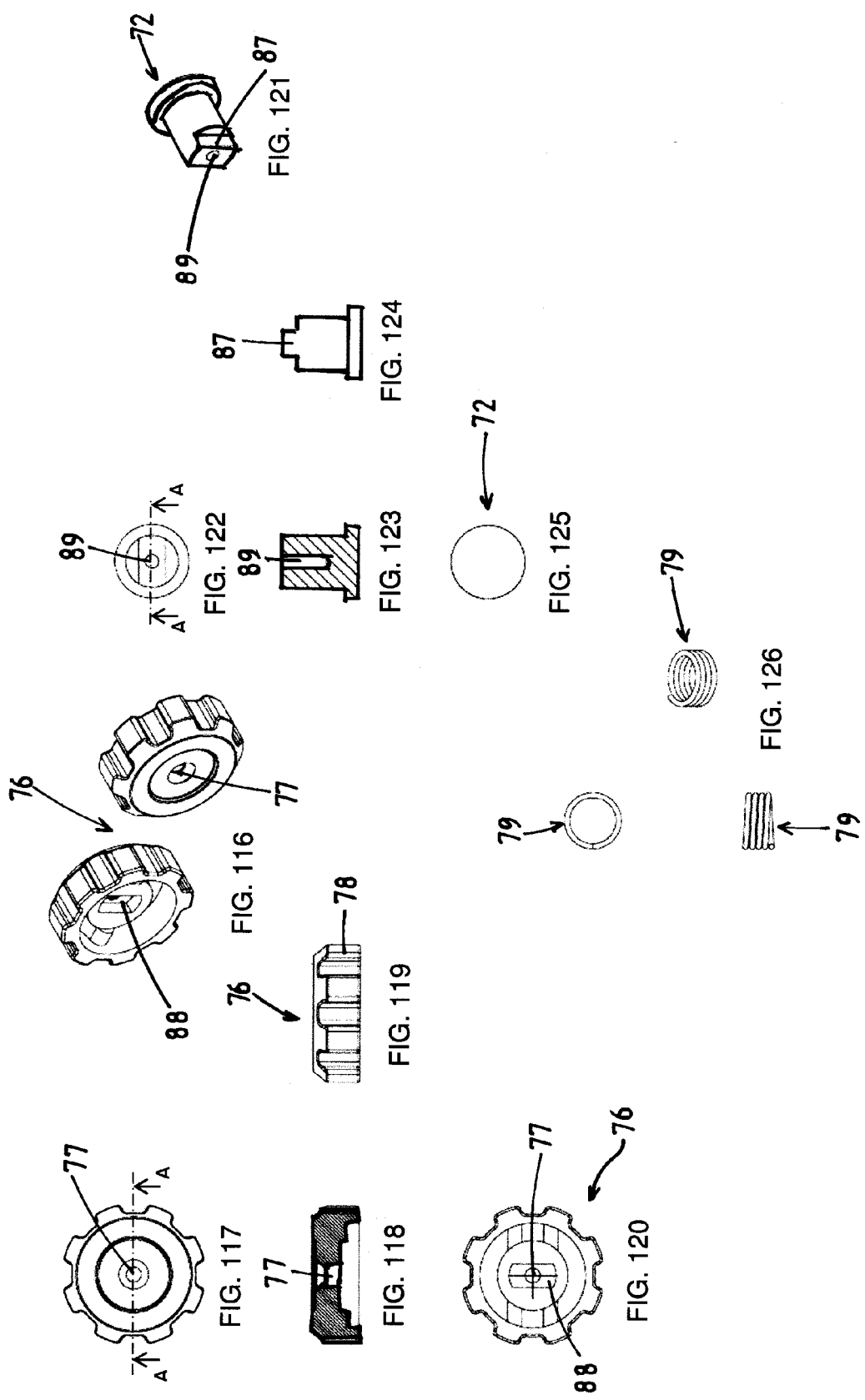

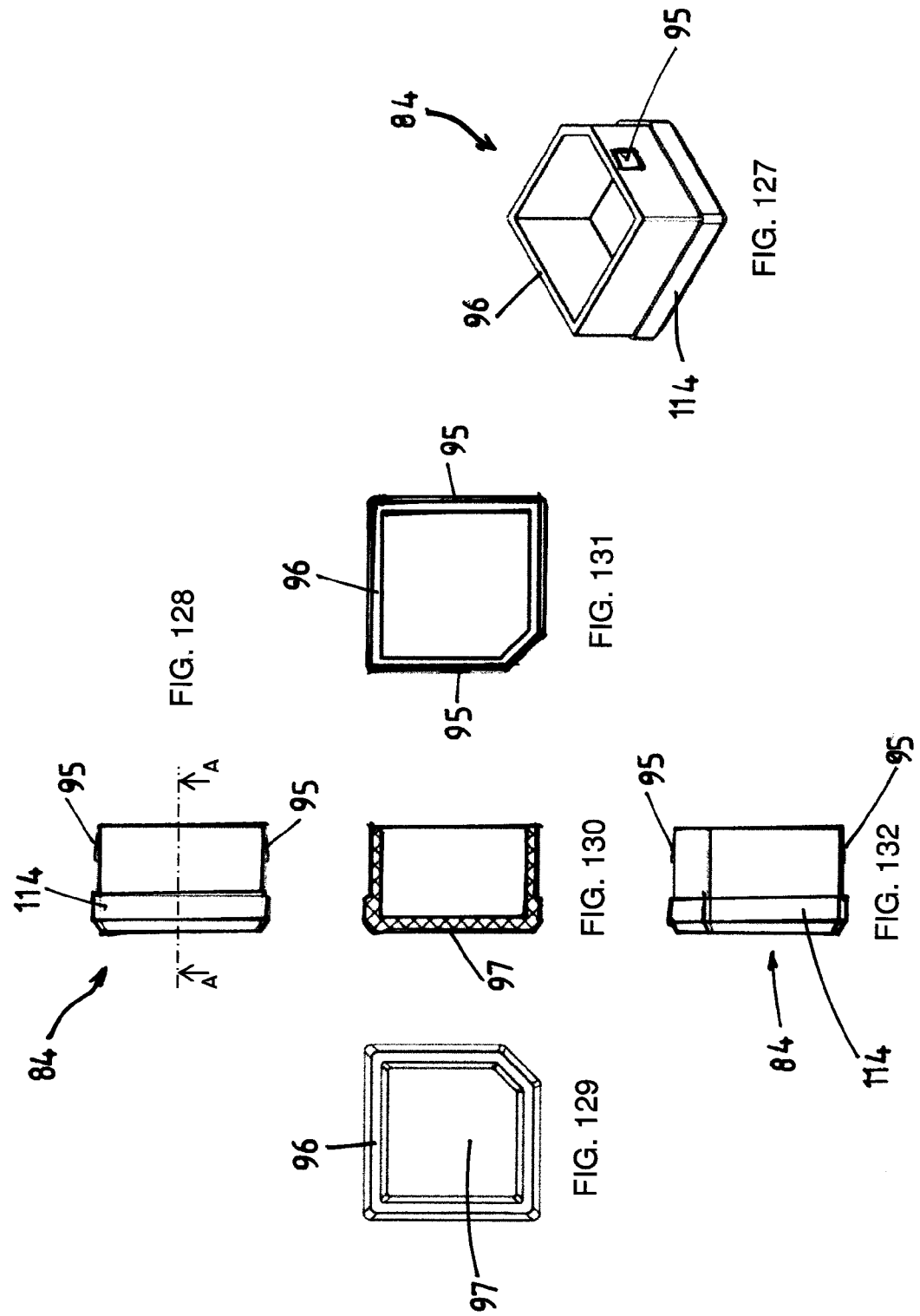

MEASURING STAFF

CROSS REFERENCE TO RELATED APPLICATIONS

This application is a continuation-in-part application of U.S. patent application Ser. No. 12/672,304 filed on Feb. 5, 2010 now pending and incorporated by reference herein.

TECHNICAL FIELD

The present invention relates to a measuring staff and in particular to a measuring staff for use in a laser leveling or an optical or automatic leveling system. The measuring staff of the invention is particularly but not exclusively suitable for measuring depths of footings, excavations of trenches, bulk excavation of sites sub-grades, as a step-down gauge for blockwork and brickwork, checking floor levels and ceiling heights, heights for windows and doors, roof levels or any other application where accurate levels are required.

BACKGROUND ART

In laser leveling techniques a laser leveling unit is set up usually on a tripod at a leveling station which gives a clear view of all points to be leveled in a building site. The relative height of a viewing plane is then determined from a known benchmark level. A measuring staff can then be held vertically on a particular location on a site and the visible laser line which intersects the staff provides a reading from a graduated scale on the staff which enables the measurement to be read off by the staff bearer. Often an elongated length of wood is used instead of a graduated measuring staff and the line at which the laser beam intersects the staff is marked with a pencil or the like. If the same staff is used for taking multiple measurements at different locations around the site, many pencil or pen marks will appear on the staff and in these circumstances, ensuring that the correct levels are established can become difficult.

The laser leveling unit can also be used with a laser receiver or detector which is releasably clamped onto a graduated staff via a slidable clamp having a pointer and the clamp may be released and slid along the staff to adjust the position of the laser detector until the detector detects the laser beam at which position, the pointer indicates a measurement on the staff. Use of a laser detector in this manner is particularly awkward and does not guarantee that correct readings are taken. Every time the laser detector is moved, there is a chance it is moved too much, too little or in the wrong direction.

With a normal staff, the way to determine how high or low the ground etc. is relative to a datum plane is to either move the laser detector on the staff up or down as above or lift the staff off the ground if the ground is too low and estimate the height. Alternatively, if the ground is too high, the staff may be leant over until the laser detector receives the laser beam and an estimate is made of the height. These methods are clearly inaccurate.

Similar problems to those described above arise when an optical level such as a dumpy level is used in combination with a sighting marker which is mountable to the staff for movement therealong.

SUMMARY OF THE INVENTION

The present invention aims to provide a measuring staff which may be used with a laser leveling or optical leveling system for establishing correct levels in a building site or in any other leveling application. Other objects and advantages of the invention will become apparent from the following description.

The present invention thus provides in one aspect a measuring staff for use with a leveling system having level-defining device and a target, said staff comprising an upper section having a first elongated member and a second elongated member extendable and retractable relative to said first elongated member, means for selectively locking said first member to said second member, said sighting indicator being adapted to be located along said first member and fixed thereto in a position aligned in use with a datum plane defined by said level-defining device to define a datum level, a graduated scale on said first member and extending longitudinally therealong, indicating means movable with said second member and adapted to cooperate with said graduated scale whereby to provide, upon extension or retraction of said second elongated member relative to said first elongated member, measurements on said graduated scale of levels above or below said datum level, and a lower extension section extendable from and selectively lockable to said upper section.

Most preferably means are provided for urging the second elongated member towards an extended position relative to the first member when the second member is not locked to the first member. The urging means may comprise resilient means such as a spring suitably a compression spring.

Preferably the first and second members are telescopically engaged with each other. Preferably the second member extends into the first member and may be telescopically moved in relation thereto so as to extend therefrom and be retracatable into the first member.

The spring or other resilient means is suitably provided between the first and second members. The spring or other resilient means is suitably located within and captured within the first member between adjacent ends of the first and second members. The spring or other resilient means is thus resiliently compressed upon retraction of the first member into the second member. Suitably the spring or other resilient means connects the first member and to the second member. The spring may be located between and connected to adjacent walls of the first and second members.

Preferably the indicating means comprises a pointer or marker on the second member adapted to cooperate with the graduated scale to indicate the extension or retraction of the second member relative to the first member. Suitably the graduated scale comprises a linear scale and the pointer or marker is mounted for movement with the second member. Preferably an elongated slot is provided in and extends longitudinally of the first member adjacent and substantially parallel to the graduated scale and the pointer or marker is connected to the second member through the slot, the pointer or marker being movable with the second member. Typically the graduated scale and slot are provided intermediate opposite ends of the first member.

Preferably the first and second members are adapted to be moved relative to each other to position the indicating means in a central or zero position along the graduated scale when the laser detector is aligned with the datum plane and the indicating means is moved in use in opposite directions from the central or zero position along the graduated scale upon extension or retraction of the second member relative to the first member to provide measurements from the central or zero position.

The graduated scale may comprise a pair of scales extending above and below the central or zero position. The scales of the pair are suitably arranged such as to provide readings which increase linearly above and below the zero position.

The respective graduated scales of the pair are suitably marked for example by being of different colors so as to be easily distinguishable from each other.

The lower extension section suitably has a scale for indicating the extension of the lower extension section from the second member. The lower extension section is suitably telescopically received within the second member. Suitably, the lower extension section includes at least one extendable and retractable elongated member, and the scale extends longitudinally along the at least one elongated member. Means may be provided for selectively locking the at least one elongated member against movement relative to said second member at a desired extension from the second member as indicated by the scale on the at least one elongated member. The at least one elongated member may comprise a third member or telescopically engaged third or fourth members. Preferably in the latter configuration, the third member is adapted to extend telescopically from the second member. The lower extension section however may include any number of telescopically engaged members. Suitably the scale on the lower section extension longitudinally thereof and is provided on each member thereof whereby the extension of each member from its adjacent member may be indicated.

The extension section preferably also includes an extendable and retractable elongated foot member. The foot member is suitably extendable and retractable relative to the third or fourth member and means are provided for indicating the extension of the foot member relative to the third or fourth member. Means are also suitably provided for selectively locking the foot member at a desired extension as indicated by the indicating means.

Preferably the foot member extends into the third or fourth member and may be telescopically moved in relation thereto.

The respective locking means suitably comprise a locking clamp or screw to lock respective members to each other. The locking clamp or screw may be mounted on one member and extended into engagement with another member to lock the one to the other member.

Preferably the means for indicating the extension of the foot member relative to the second member comprises a ruler or scale which is provided on and extends along the foot member and which cooperates with the member from which it extends to provide an indication of the extension of the foot member. The ruler or scale may comprise specified markings such heights of bricks or blocks. Respective rulers or scales may be provided on two or more faces of the fourth member, each carrying different markings to represent different brick or block heights.

The leveling system as above suitably comprises a laser leveling system but may comprise an optical measuring system in which case the laser detector is replaced by a target or a sighting marker.

Thus in this latter aspect, the present invention provides a measuring staff for use with a leveling system having a level defining device and a target, the measuring staff comprising an upper section having a first elongated member and a second elongated member extendable and retractable relative to said first elongated member, means for selectively locking said first member to said second member, said target being adapted to be located along said first member and fixed thereto in a position aligned in use with a datum plane defined by the level defining device to define a datum level, a graduated scale on said first member and extending longitudinally therealong, indicating means movable with said second member and adapted to cooperate with said graduated scale whereby to provide, upon extension or retraction of said second elongated member relative to said first elongated member, measurements on said graduated scale of levels above or below said datum level, and a lower extension section extendable from and selectively lockable to said upper section.

The first and second members are suitably adapted to be moved relative to each other to position the indicating means in a central or zero position along the graduated scale when the laser detector is aligned with the laser beam and the indicating means is moved in use in opposite directions from said central or zero position along the graduated scale upon extension or retraction of the second member relative to the first member to provide said measurements from the central or zero position.

In another aspect, the present invention provides a measuring staff comprising an upper section having a first elongated member and a second elongated member extendable from and retractable into a lower end of said first elongated member, means for selectively locking said first member to said second member, a graduated scale on said first member and extending longitudinally therealong, indicating means movable with said second member and adapted to cooperate with said graduated scale whereby to provide, upon extension or retraction of said second elongated member relative to said first elongated member, measurements on said graduated scale of levels above and below a datum level, and a lower extension section extendable from and selectively lockable to said upper section.

Means are suitably provided for urging the second elongated member towards an extended position relative to the first member when the second member is not locked by the locking means to the first member. The first and second members are suitably telescopically engaged with each other and the urging means comprises a spring between the first and second member. The second member is suitably extendable from and retractable into the first member. The spring is suitably located within the first member between adjacent ends of the first and second members, the spring being resiliently compressed upon retraction of the first member into the second member.

In accordance with a further aspect, the present invention provides a measuring staff for use with a laser leveling system including a laser detector for detecting a laser beam, said staff comprising: an upper section having a first elongated member and a second elongated member, said second elongated member capable of being extended and retracted relative to the first elongated member, wherein said laser detector is adapted to be located along said first elongated member and fixed thereto in a position aligned in use with said laser beam to define a datum level; a clamping means located on the first elongated member for selectively clamping the second elongate member in an extended or retracted position such that the clamping means locks the second elongate member against movement relative to the first elongate member; a graduated scale on said second elongated member and extending longitudinally therealong; an indicating means located on said first elongated member and adapted to display the graduated scale on said second elongated member whereby to provide, upon extension or retraction of said second elongated member relative to said first elongated member, measurements on said graduated scale of levels above or below said datum level; and a lower extension section extendable from and releasably engageable with said upper section.

The first and second elongated members may be telescopically engaged with each other. The second member may be extendable from and retractable into said first member.

The first and second elongated members may be adapted to be moved relative to each other to position said indicating means in use to display a central or zero position along said graduated scale on said second elongated member when said laser detector may be aligned with said datum plane and wherein said second elongated member may be moved in use in opposite directions from said central or zero position along said graduated scale upon extension or retraction of said second elongated member relative to said first elongated member to provide said measurements from said central or zero position.

The graduated scale may comprise s a pair of scales extending above and below said central or zero position and wherein said scales of said pair of scales may be marked to provide readings which increase linearly above and below said central or zero position.

The measuring staff may further include a resistance means located in an upper end of said second elongated member to oppose or retard motion of the second elongated member when it is extended or retracted with reference to the first elongated member. Said resistance means may comprise a resilient means, wherein said resilient means applies a pressure against an inner surface of said first elongated member to oppose or retard the motion of the second elongated member.

The clamping means may include a collar extending over an end of said first elongated member and adapted to guide said second elongated member to extend and retract telescopically with respect to the first elongated member. The clamping means may further include a locking pin which may be biased towards and away from said second elongated member by an actuator means, said locking pin locks the second elongate member against movement relative to the first elongate member. The biasing means may comprise a spring located between said locking pin and said actuator means.

The lower extension section may be telescopically extendable from a lower end of said second member. The lower extension section may further include at least one extension member, whereby said at least one extension member may include a longitudinally extending insert which may be adapted to allow the lower extension section to be releasably engaged with said upper section.

An end of said second elongated member may include a releasably engageable clamp assembly which may be adapted to releasably engage said longitudinally extending insert of said at least one extension member to allow said extension member to extend and retract relative to said second elongated member. The releasably engageable clamp may include a biased lever which pivotally engages said longitudinally extending insert to allow said extension member to extend and retract relative to said second elongated member.

A measuring staff wherein said at least one extension member may further include a resistance means located in an upper end of said at least one extension member to oppose or retard motion of the at least one extension member when it is extended or retracted with reference to the upper section. Said resistance means may comprise a resilient means, wherein said resilient means applies a pressure against an inner surface of said second elongated member to oppose or retard the motion of the at least one extension member.

The lower extension section may include three extension members, whereby each said extension member includes a longitudinally extending insert which may be adapted to allow each extension member to be releasably engaged with another extension member or said second elongated member to allow each extension member to extend and retract relative to another extension member or relative to said second elongated member. At least one of said three extension members may include an elongated extendable or retractable foot, said foot being marked with a plurality of brick or block heights. The foot may be telescopically engaged with said first or second elongated member.

BRIEF DESCRIPTION OF THE DRAWINGS

In order that the invention may be more readily understood and put into practical effect, reference will now be made to the accompanying drawings which illustrate a preferred embodiment of the invention. The embodiment has been described in relation to a laser leveling system however the measuring staff of the invention may also be used with a dumpy level or other optical or automatic level. In the drawings:—

FIG. 4 is an enlarged view of the region A of FIG. 1;

FIG. 5 is an enlarged sectional view along line B-B of FIG. 4

FIG. 6 is an enlarged view of the region C of FIG. 1;

FIG. 7 is an enlarged view of the region D of FIG. 1;

FIG. 8 is an enlarged view of the region E of FIG. 2;

FIG. 9 is an enlarged view of the region D of FIG. 1 in an extended position of the staff;

FIG. 15 illustrates a third embodiment of a staff according to the invention;

FIGS. 16 to 19 show a front, side views and a rear view of the staff of FIG. 15;

FIGS. 22 and 23 show an end view and a side view of the shaft of the lower extendable member of FIG. 21;

FIGS. 24 and 25 illustrate a front view and an end view of the shaft insert for the lower extendable member of FIG. 21;

FIGS. 26 to 31 illustrate the lower end cap of the lower extendable member where FIG. 29 shows a sectional view along line A-A of FIG. 27;

FIGS. 32 to 38 illustrate the upper end cap of the lower extendable member where FIG. 35 shows a sectional view along line A-A of FIG. 33;

FIGS. 39 to 44 illustrate the end cap lid for the upper end cap of FIG. 32 where FIG. 42 shows a sectional view along line A-A of FIG. 40;

FIGS. 45 to 49 illustrate the end cap button for the upper end cap of FIG. 32 where FIG. 47 shows a sectional view along line A-A of FIG. 46;

FIG. 50 illustrates a spring used in the upper end cap of FIG. 32;

FIGS. 58 to 63 illustrate a body of the clamp assembly of FIG. 56 where FIG. 61 is a sectional view along line A-A of FIG. 59;

FIGS. 64 to 68 illustrate an end clamp lever of the end clamp of FIG. 56 where FIG. 66 shows a sectional view along line A-A of FIG. 65;

FIG. 69 shows a pivot pin of the clamp assembly of FIG. 56;

FIGS. 70 and 71 show the two springs used in the clamp assembly of FIG. 56;

FIGS. 72 to 78 illustrate an upper end cap of the second extension member where FIG. 75 shows a sectional view along line A-A of FIG. 73;

FIGS. 80 and 81 show an end view and a side view of the shaft of the first extension member of FIG. 79;

FIGS. 82 and 83 illustrate a front view and an end view of the shaft insert for the first extension member of FIG. 79;

FIGS. 84 to 90 illustrate an upper end cap of the first extension member where FIG. 87 shows a sectional view along line A-A of FIG. 85;

FIGS. 94 to 100 illustrate an upper end cap of the second elongated member where FIG. 97 shows a sectional view along line A-A of FIG. 95;

FIG. 103 shows a sectional view along line A-A of FIG. 102;

FIG. 114 shows a sectional view along the line A-A of FIG. 113;

FIGS. 116 to 120 illustrate a locking knob used on the shaft collar of FIGS. 111 to 115 where FIG. 118 shows a sectional view along the line A-A of FIG. 117;

FIGS. 121 to 125 illustrate a locking pin used in the shaft collar of FIGS. 111 to 115 where FIG. 123 shows a sectional view along the line A-A of FIG. 122;

FIG. 126 shows a spring used to bias the locking pin of FIGS. 121 to 125 towards the second elongated member of FIG. 91; and FIGS. 127 to 132 illustrate an outer end cap mounted to the top end of the first elongated member where FIG. 130 shows a sectional view along the line A-A of FIG. 128.

DETAILED DESCRIPTION OF THE PREFERRED EMBODIMENT

Figures 1, 2, 3:
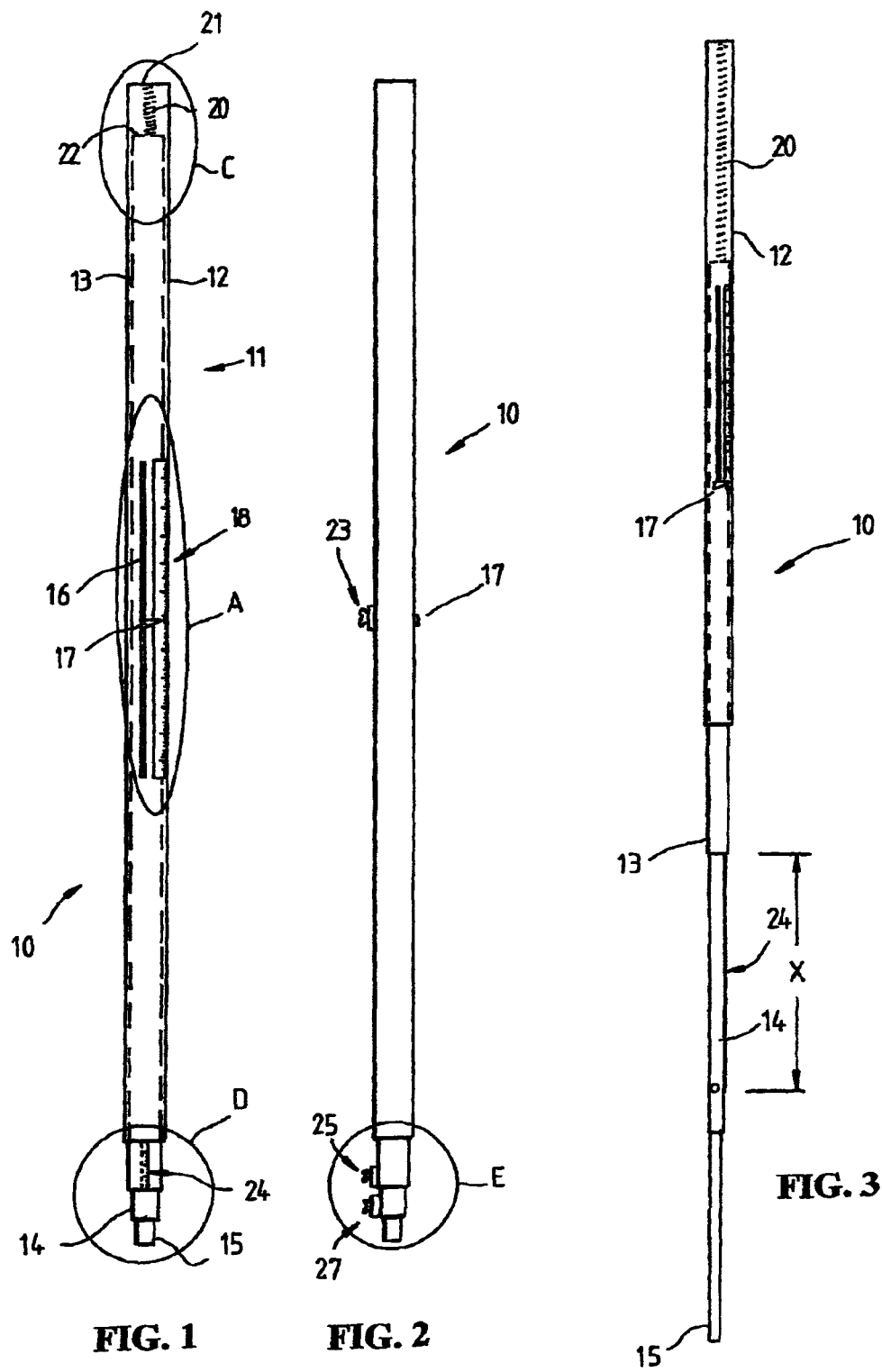
FIG. 1 is a side view of the measuring staff according to an embodiment of the invention in a retracted position.
FIG. 2 is a front view of the staff of FIG. 1.
FIG. 3 is a side view of the staff of FIG. 1 in a fully extended position (in reduced scale)

Referring to the drawings and firstly to FIGS. 1 and 2, there is illustrated a measuring staff 10 according to the present invention for use primarily in a rotary laser leveling system, the staff 10 having a normally upper section 11 comprising an outer elongated hollow member 12 formed of a rigid material such as aluminum and an inner hollow member 13 which is telescopically received in the hollow member 12, the member 12 for this purpose being of complementary shape to the member 11 and also being formed of a rigid material such as aluminum. The members 12 and 13 are preferably of a hollow square section however they may be of any other sectional configuration. The staff additionally includes a lower extension section extendable from the upper section 11, the lower section comprising an intermediate third member 14 telescopically extendable from the member 13 of the upper section and a lower extendable member or foot member 15 telescopically extendable from the intermediate member 14 such that the staff 10 is extendable from the retracted position of FIGS. 1 and 2 to the fully extended position of FIG. 3. The members 14 and 15 are also preferably of hollow square cross section and formed of aluminum or other rigid material although they may be of any other sectional configuration or material.

As shown in FIG. 1 and more clearly in FIGS. 4 and 5, the outer member 11 of the upper section 11 is provided with a longitudinally extending elongated slot 16 arranged at an intermediate position along the member 13 and a pointer or marker 17 is connected to the inner member 13 through the slot 16 for example by threaded connectors which project through the slot 16 such that the pointer or marker 17 is movable with the member 13 relative to the member 12. The outer member 12 is also provided with a linear graduated scale 18 which is parallel to and which extends substantially the same length as the slot 16 and is laterally aligned therewith such that the pointer or marker 17 can point to a reading on the scale 18 which enables the position of the pointer or marker 17 along the slot 16 to be read on the scale 18. In the illustrated embodiment, the graduated scale 18 extends symmetrically 200 mm on opposite sides of the central or zero position 19 of the pointer 17 which is at a central location longitudinally of the slot 16. The scale is marked to measure increasing distance of the pointer or marker 17 from the zero position 19 on opposite sides thereof. The scale 18 and slot 16 however may be of an increased length or reduced length.

The outer member 12 also houses a longitudinally extending compression spring 20 which is connected to and acts between an end wall 21 of the outer member 12 and the adjacent opposing end wall 22 of the inner member 13 as also shown in FIG. 6 such as to apply a resilient force to the inner member 13 to urge the inner member 13 when not constrained to a position extending from the outer member 12 and resiliently opposite movement of the inner member 13 into the outer member 12. The inner member 13 however remains connected to the outer member 12 by the spring 20.

A thumb screw or other locking screw 23 is mounted on the reverse side of the member 12 such that when the thumb or locking screw 23 is rotated in a clamping direction, it will extend into the member 12 to engage the inner member 13 to lock the inner member 13 against movement relative to the outer member 12. Tightening of the thumb or locking screw 23 to lock the member 13 relative to the member 12 thus allows the pointer 17 to be locked in any position along the slot 16 for example at the zero position 19 or on either side of the zero position 19.

The extendable intermediate member 14 which is complementary to the member 13 is telescopically receivable in the end of the member 13 while the foot member 15 is complementary to the member 14 and telescopically received in the member 14 as shown in FIGS. 7 and 8. The intermediate member 14 is provided with a ruler or scale 24 as shown more clearly in FIG. 9 which extends longitudinally therealong and cooperates with the member 13 to indicate by cooperation with the end of the member 13 the degree of extension of the first intermediate member 14 and foot member 15 from the member 13. In the position of FIG. 1 the scale 24 is hidden behind the member 13 and is at a zero position such that when the member 14 is extended from the member 13, the scale 24 provides a measurement of that extension for example the dimension X in FIG. 3.

Another thumb screw or other locking screw 25 similar to the screw 23 is provided on the member 13 to enable the intermediate member 14 to be locked in an extended position as desired relative to the member 13 and as indicated by the ruler or scale 24 thereon.

The second extendable member or foot member 15 is also provided with a scale or calibration markings 26 which are graduated at a plurality of block, brick or presto brick heights on three faces of the member 15 to indicate required levels for brick or block laying for step downs in footings to suit the bricks or blocks being used. A further thumb screw or other locking screw 27 is provided on the extendable member 14, the locking screw 27 when tightened locking the second extendable member 15 in a desired extension position relative to the extendable member 14.

In use for building on a site, the floor level for the building which is marked on the building plan is established from the reduced level (R.L) which provides a benchmark datum level for the building for establishing the floor level, overall height of the building and other levels. A surveyor will normally place the R.L. on the curb which provides a level from which measurement is taken. For example, if the R.L. at the curb is 1245 mm and floor slab R.L. is required to be 1760 mm, the R.L. for the floor slab is 515 mm above the R.L. mark.

Figure 10:
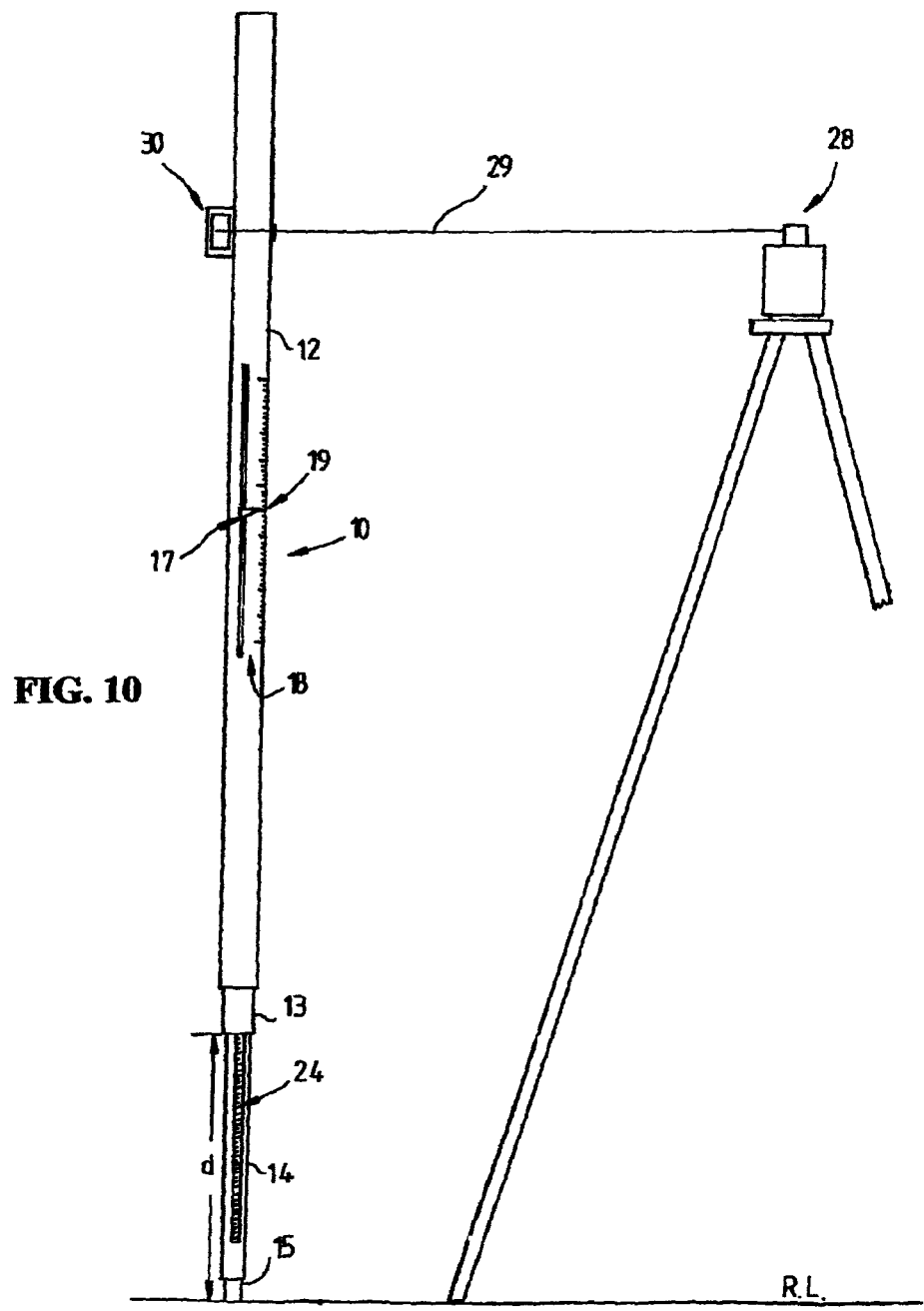
FIG. 10 illustrates the manner in which the staff is initially set up for use.

The staff 10 is adjusted by sliding the member 13 longitudinally of the member 12 until the pointer 17 is in the central zero position 19 at which position, the member 13 is locked by the thumb screw 23. The lower foot member 15 is also fully retracted and locked in position by the thumb screw 27. The staff 10 is then adjusted by sliding the intermediate member 14 outwardly from the end of the member 13 so that it and the retracted foot 15 extend a total distance of "d" from the member 13, in this case at a reading of 515 mm on the ruler 24 at which position the member 14 is locked by the thumb screw 25 as shown in FIG. 10. The foot of the staff 10 is placed on the R.L. and the staff held in an upright position. A rotary laser level 28 is then set up level to establish a rotating laser beam 29 in a horizontal plane with the laser beam 29 intersecting the upright staff 10. A laser detector 30 is positioned on the member 12 of the staff 10 and moved or slid therealong until the beam 29 is detected by the detector 30 and centralized as indicated on a screen on the detector 30 for exact alignment of the detector 30 with the beam 29. The laser detector 30 is then locked or clamped to the member 12 which determines the datum R.L. Once the level is determined as above, the intermediate member 14 is slid back into the member 13 to the zero extension position as indicated on the ruler 24. The bottom of the retracted staff 10 is now at the floor slab R.L. as it has been retracted the distance "d" (or in the specific case described 515 mm) into the member 13. The user can then use the staff 10 to mark the floor slab R.L on a fixed member anywhere on the site which is not going to move such as a fence post by holding the staff 10 vertically, aligning the laser detector 30 with the beam 29 and making a mark on the fixed member. Each day when the laser 28 is reset, this mark having been previously determined is used to set the floor level (or floor R.L.). As the floor level relative to the datum R.L is now set, a number of functions can be undertaken, and measurements can be made, with the staff 10 without moving the laser detector 30 from its fixed position on the staff 10 as referred to above.

Figure 11:
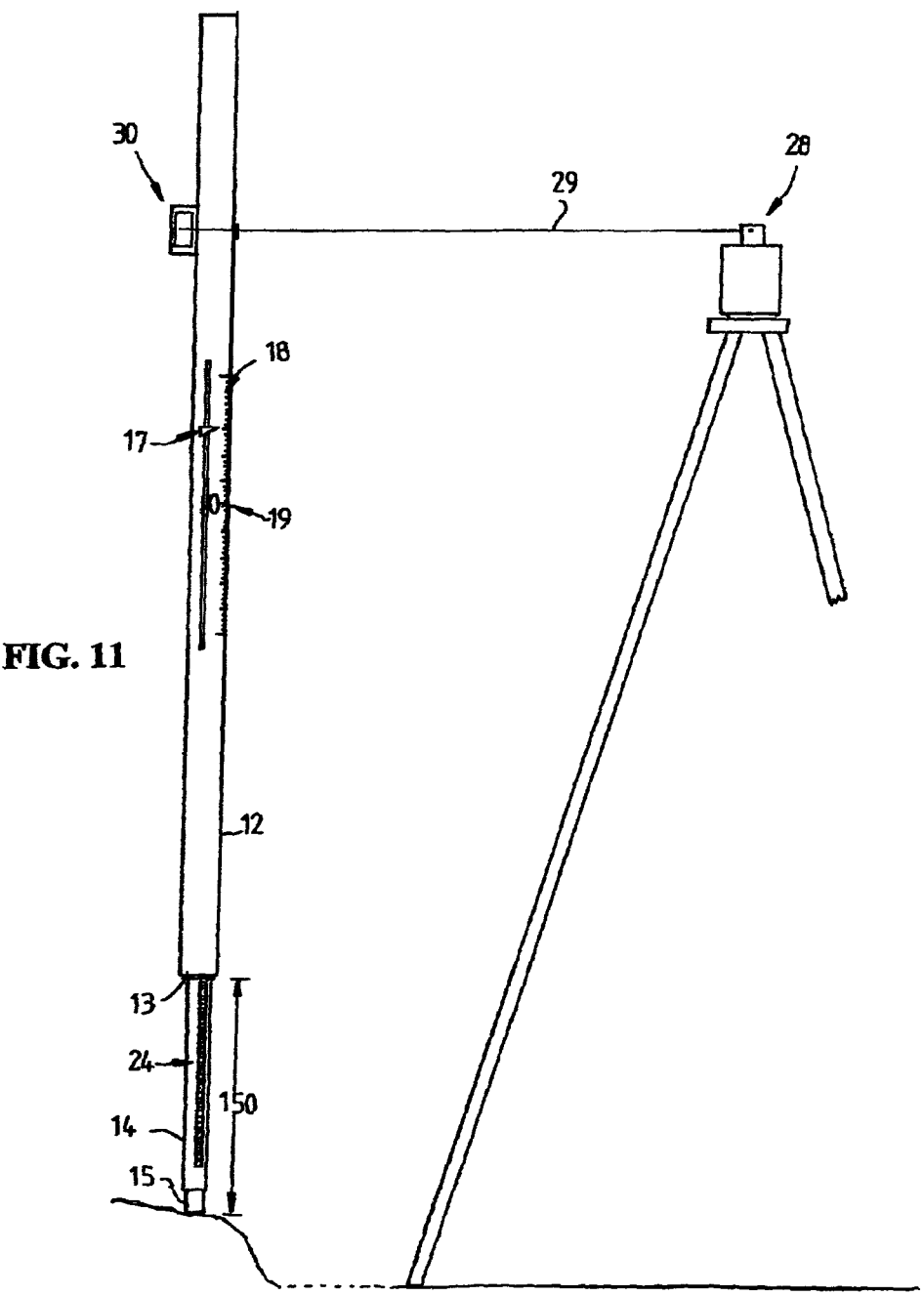
FIGS. 11 and 12 illustrates typical use of the staff of FIG. 1.

For example if a cut and fill is required for construction on a building site of a slab of a thickness of 100 mm with bedding sand of a thickness of 50 mm, the cut level on which the slab is to constructed is required to be 150 mm below the floor R.L. The intermediate member 14 of the staff 10 is extended 150 mm from the member 13 as indicated on the scale 24 and is then locked in place to the member 13 with the thumb screw 25 as shown in FIG. 11. The thumb screw 23 which locks the two members 12 and 13 of the upper section 11 together is then released which will allow the member 13 to be urged outwardly of the member 12 due to the force exerted by the spring 20. The bottom or foot member 15 of the staff 10 is then placed on the ground where the slab is to be formed and the outer member 12 longitudinally adjusted or slid relative to the inner member 13 until the laser detector 30 receives the beam 29 at which position the reading of the pointer 17 on the scale 18 will indicate whether the ground level is too high or too low. For example, if the pointer 17 is above the zero position 19 as shown in FIG. 11 which has occurred because the member 12 is pushed down against the spring 20 to retract the member 13 into the member 12, the measurement indicated on the scale 18 indicates how much the ground level is too high in relation the height of the cut. If the pointer 17 is on the lower side of the zero position 19 which occurs when the member 13 extends under the influence of the spring 20 further outwardly of the member 12, the reading of the pointer 17 on the scale 18 indicates how low the ground is in relation to the cut. By reading these measurements, an excavator can be told exactly how much he needs to either cut down or fill up to establish the correct level for the bedding sand and slab to be constructed thereon.

Figure 12:
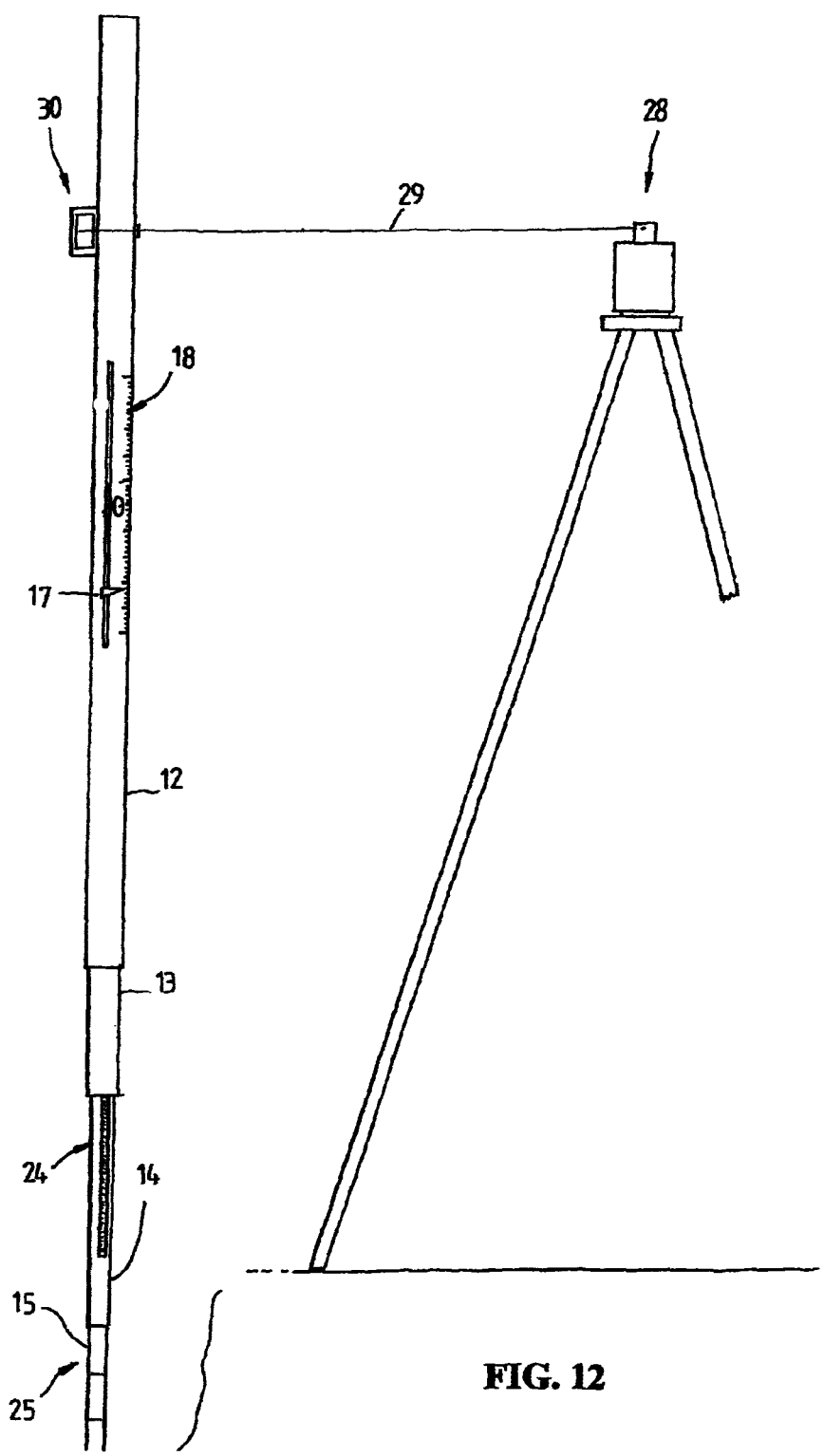

For digging footings, the depth of the footings below the slab R.L. are determined. For example for a 300 mm edge beam and a 400 mm deep footing, an excavation of 700 mm total below the floor R.L is required. Thus the intermediate member 14 is set at a 700 mm extension from the member 13 as indicated on the ruler 24 and locked in place. The member 13 is then released from the member 12 by release of the thumb screw 23 which permits the member 12 to slide in opposite directions up and down relative to the member 13 as allowed by the spring 20. The staff is then vertically positioned with the foot member 15 on the ground and the detector 30 aligned with the beam 29 and the reading of the pointer 17 on the scale 24 will provide a measurement of whether an excavator has dug too deep or not deep enough in a similar manner to that described in reference to FIG. 11.

Where it is necessary to step the footings for example where the land falls away, the foot member 15 is slid outwardly from the member 14 as shown in FIG. 12 to a marking on the scale 15 in accordance with the number of brickwork levels required. In the embodiment of FIG. 10, the member 15 is slid out three markings indicative of three levels of brickwork. The member 15 is then locked in position by the thumb screw 27 to lock it in the height required and the procedure described above in relation to FIG. 11 repeated to determine the excavation or fill required for the footing level.

In each of the above procedures, it will be apparent that there is no necessity to move the laser detector 30 which has been previously been set up in the correct position at the floor R.L. whereas the use of a conventional staff requires the detector 30 to be adjusted along a staff which inevitably leads to errors.

Figure 13:
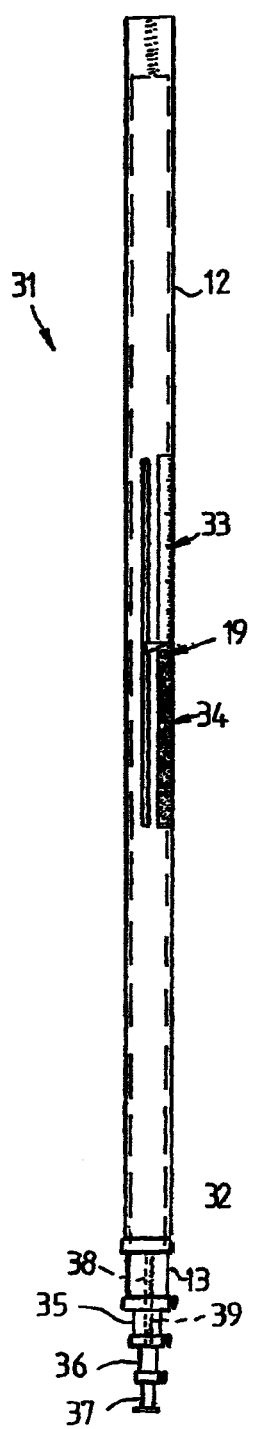
FIG. 13 illustrates a second embodiment of staff according to the invention.
Figure 14:
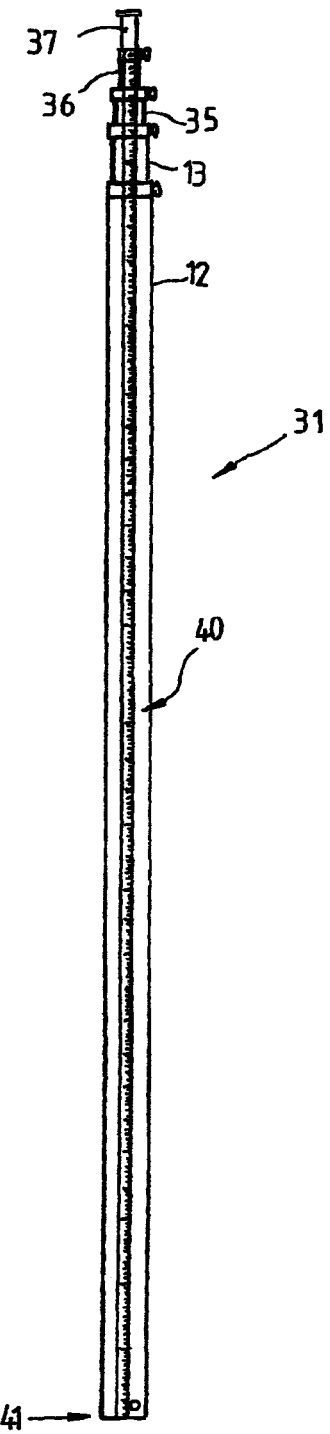
FIG. 14 illustrates the staff of FIG. 13 from the opposite side and shown inverted for use as a conventional staff.

FIGS. 13 and 14 illustrate an alternative embodiment of measuring staff 31 according to the invention which is similar to the embodiment of FIGS. 1 to 9 and in which like components have been given like numerals. In this case however the inner member 13 is lockable to the outer member 12 for example to align the pointer 17 with the zero position on the scale 18 by means of a screw clamp 32 provided at the end of the member 13. The graduated scale 18 is provided two parts 33 and 34 which extend symmetrically to opposite sides of (that is above and below in FIG. 13) of the zero position 19. The parts 33 and 34 of the scale 18 may be provided in contrasting colors to enable easier distinguishing between the scale parts.

The staff 31 of FIGS. 13 and 14 also has an extension portion comprising three telescopic extendable members 35, 36 and 37 with the member 35 and 36 having longitudinally extending linear scales 38 and 39 respectively similar to the scale 24, the scale 38 indicating extension of the member 35 form the member 13 and the scale 39 indication extension of the member 36 form the member 35. The additional extendable member 36 in this embodiment provides a staff of increased extendable length which may be required for certain applications. The member 37 comprises a foot member and may be marked with brick or block heights as with the member 15 of the embodiment of FIGS. 1 to 9.

The staff 31 also includes as shown in FIG. 14 a scale 40 on its rear side which starts at a zero position 41 at the top of the member 12 in the orientation of the staff 31 shown in FIG. 13 but at the bottom of the member 12 in the orientation of the staff 31 shown in FIG. 14. The scale 39 extends as a continuous linear scale along each member 12, 13, 35 and 36 when the members 13, 35 and 36 are fully extended.

The staff 31 may be used in its orientation of FIG. 13 in the same manner as described with reference to FIGS. 10 to 12. The staff 31 however may also be inverted from its position of FIG. 13 and reversed to the position of FIG. 14 to enable it to be used as a conventional staff with measurements taken from the scale 40 either on the member 12 or one of the extended members 13, and 36 to provide a distance from the zero position 41.

The staff 50 as shown in FIGS. 15 to 20 may be used in the same manner as described and with reference to FIGS. 1 to 14. In FIGS. 15 to 20, there is illustrated a measuring staff 50 according to a further embodiment of the present invention for use primarily in a rotary laser leveling system. The staff 50 having a normally upper section 51 comprising a first elongated hollow member 52 formed of a rigid material such as aluminum and a second elongated inner hollow member 53 which is telescopically received in the first member 52, the first member 52 for this purpose being of complementary shape to the second member 53 and also being formed of a rigid material such as aluminum.

The first and second elongated members 52 and 53 are preferably of a substantially hollow rectangular section however they may be of any other sectional configuration. The cross sectional shape is described in further detail below.

The staff 50 additionally includes a lower extension section extendable from the upper section 51. The lower section comprises a first extension member 54 telescopically extendable from the second elongated member 53 of the upper section 51 and a second extension member 55 telescopically extendable from the first extension member 54 and a lower extendable member or foot member 56 telescopically extendable from the second extension member 55 such that the staff 50 is extendable from the retracted position of FIGS. 15 to 19 to a fully extended position (not shown).

The members 54, 55 and 56 are also preferably of hollow rectangular cross section and formed of aluminum or any other rigid material although they may be of any other sectional configuration or material.

Figures 107, 108, 109, 110:
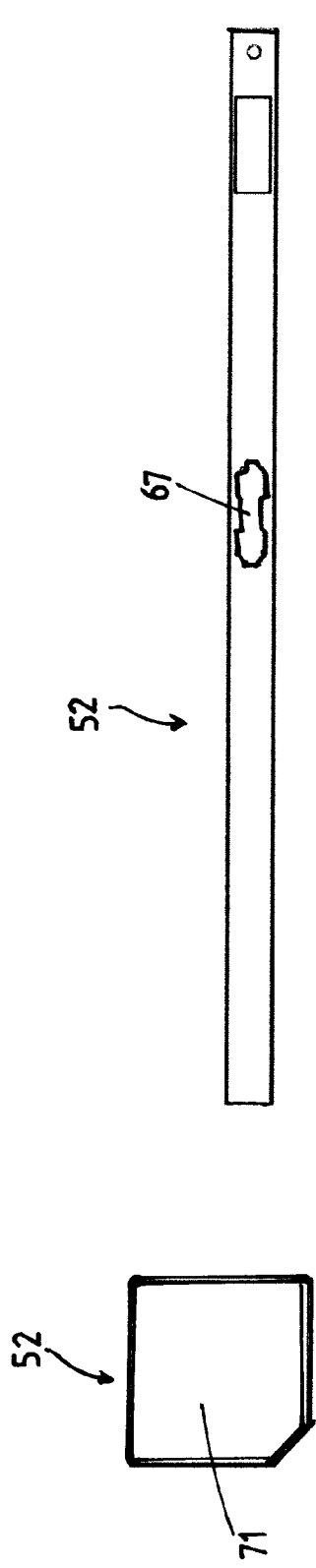
FIGS. 107 and 108 illustrate an end view and a side view of the shaft of the first elongated member of FIG. 106.
FIGS. 109 and 110 show a window and a window bezel suitable for mounting on the first elongated member of FIG. 106.
Figure 111:
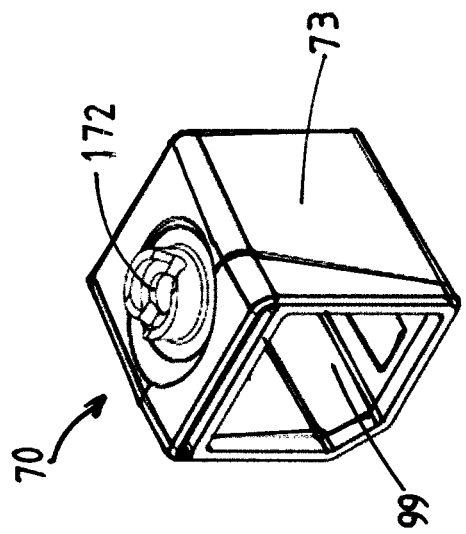
FIGS. 111 to 115 illustrate a shaft collar used in the lower end of the first elongated member where
Figure 115:
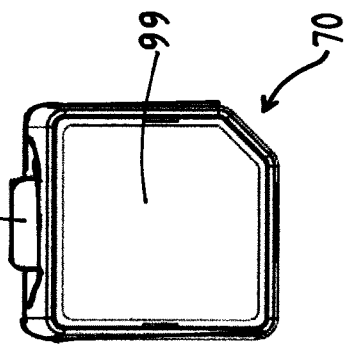
Figure 114:
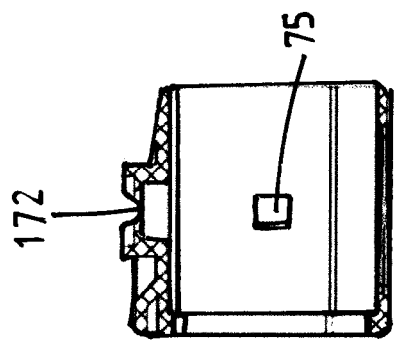
Figure 112:
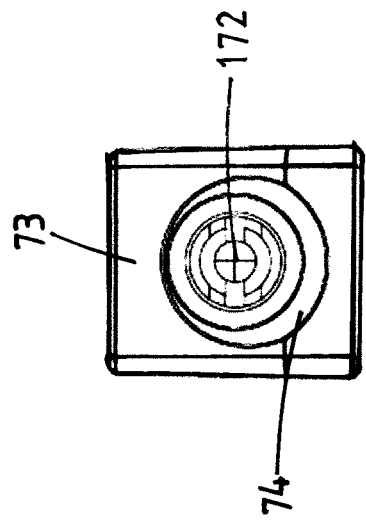
Figure 113:
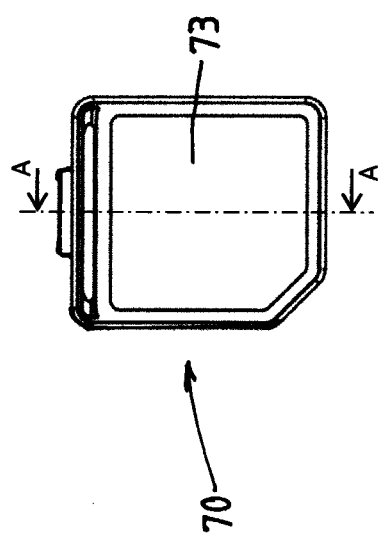

As shown in FIG. 15 and in more detail in FIGS. 106 to 110 the first elongated member 52 of the upper section 51 is provided with a window assembly 58 arranged at an intermediate position along the first elongated member 52. The window assembly 58 consists of a bezel 69 fitted over a window 68 and aligned and mounted over an opening 67 in the first elongated member 52. As shown in FIG. 107 the first elongated member 52 is formed with a substantially hollow rectangular section and having an opening 71 at either end of the first elongated member 52. At one corner of the section a chamfer at approximately 45 degrees is formed between two adjacent principal faces of the section of the first elongated member 52. The chamfer extends substantially the entire length of the first elongated member 52.

At one end of the first elongated member 52 and mounted over the opening 71 is a shaft collar 70 as shown in FIGS. 106 and 111 to 126. The shaft collar 70 is used to lock the second elongated member 53 in an extended, retracted or intermediate position in relation to the first elongated member 52. The shaft collar 70 is mounted to the first elongated member by opposing clips 75 which project internally within the shaft collar 70 and locate in complementary apertures in opposing sides of the first elongated member 52. The shaft collar 70 includes a body 73 with four connected sides and openings 99 at either end. The locking pin 72 is located within the hole or opening 172 in the collar 70. The locking knob 76 is positioned within the recess 74 of the collar 70.

The locking pin 72 is biased towards and away from the second elongated member 53 by a spring 79 and locking knob 76. By performing a turning action on the locking knob 76 either in a clockwise direction to increase the tension between the spring 79 and subsequently the locking pin 72 or in a counter clockwise direction to reduce the tension between the spring 79 and locking pin 72. The locking knob 76 in order to be easily rotated has raised sections 78 located and extending around the outside surface of locking knob 76. The locking pin 72 includes a locating lug or raised section 87 which is located within a recess 88 in the locking knob 76. The locking knob 76 is secured to the locking pin 72 by a fastener which passes through the opening 77 in the locking knob 76 and is secured into the threaded section 89 of the locking pin 72. The spring 79 is located between the under surface of the locking knob 76 and rests over the locking pin 72 and is seated on the outside surface of the shaft collar 70.

At the other end of the first elongated member 52 an outer end cap 84 is located and retained in the end of the elongated member 52. As shown in FIGS. 127 to 132 the outer end cap 84 fits into the end of the first elongated member 52 and is secured by clips 95 on opposing side walls 96 which locate in complementary apertures in opposing end walls of the elongated member 52. A raised edge 114 of the end cap 84 is seated against the end surface of the first elongated member 52 and prevents the end cap 84 from further entering inside the first elongated member 52. The end cap 84 has an outside wall 97 which closes off the end of the first elongated member 52.

The inner or second elongated hollow member 53 is provided with a linear graduated scale 59 which is parallel to and which extends along the length of the second elongated hollow member 53. The scale 59 is situated so that it is visible from the window 58 of the first elongated member 52. In the illustrated embodiment, the graduated scale 18 extends symmetrically a predetermined distance on opposite sides of a central or zero position which is at a central location longitudinally of the scale 59. Typically the scale is marked to measure increasing distance away from the zero position on opposite sides thereof. The scale 59 may be of an increased length or reduced length.

Figure 20:
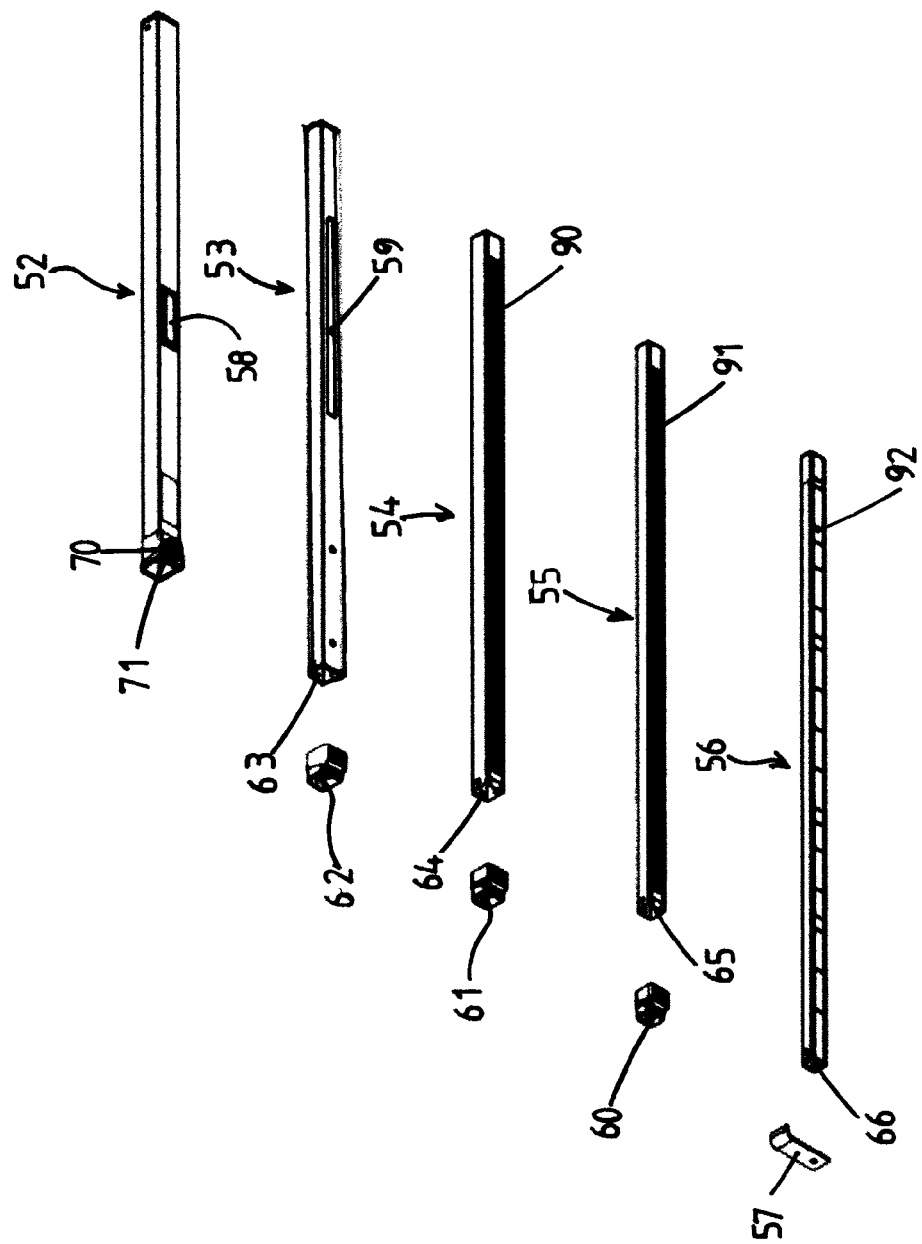
FIG. 20 illustrates the staff of FIG. 15 in a disassembled view showing each component of the staff.
Figure 21:
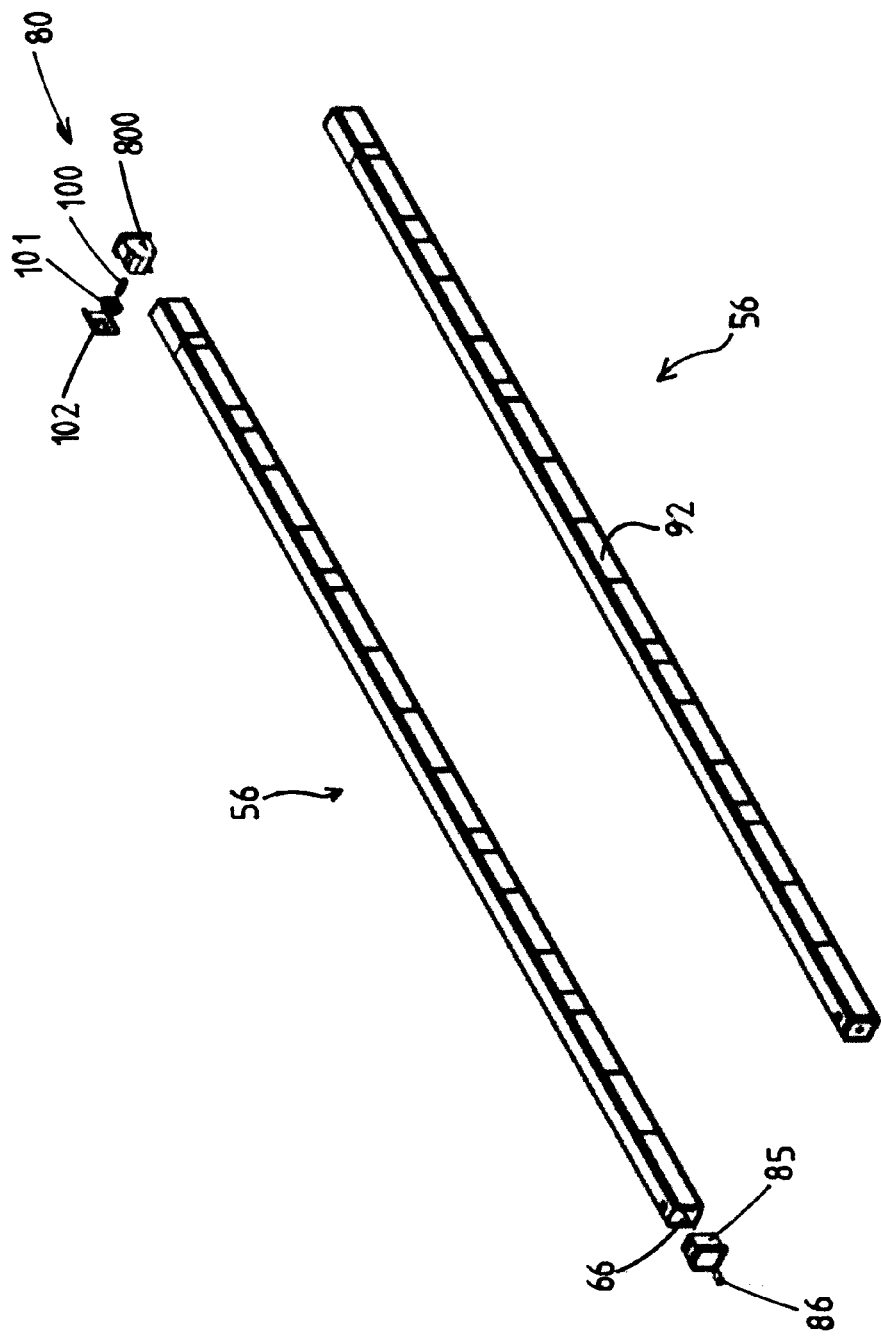
FIG. 21 illustrates the lower extendable member of the staff of FIG. 15.
Figure 51:
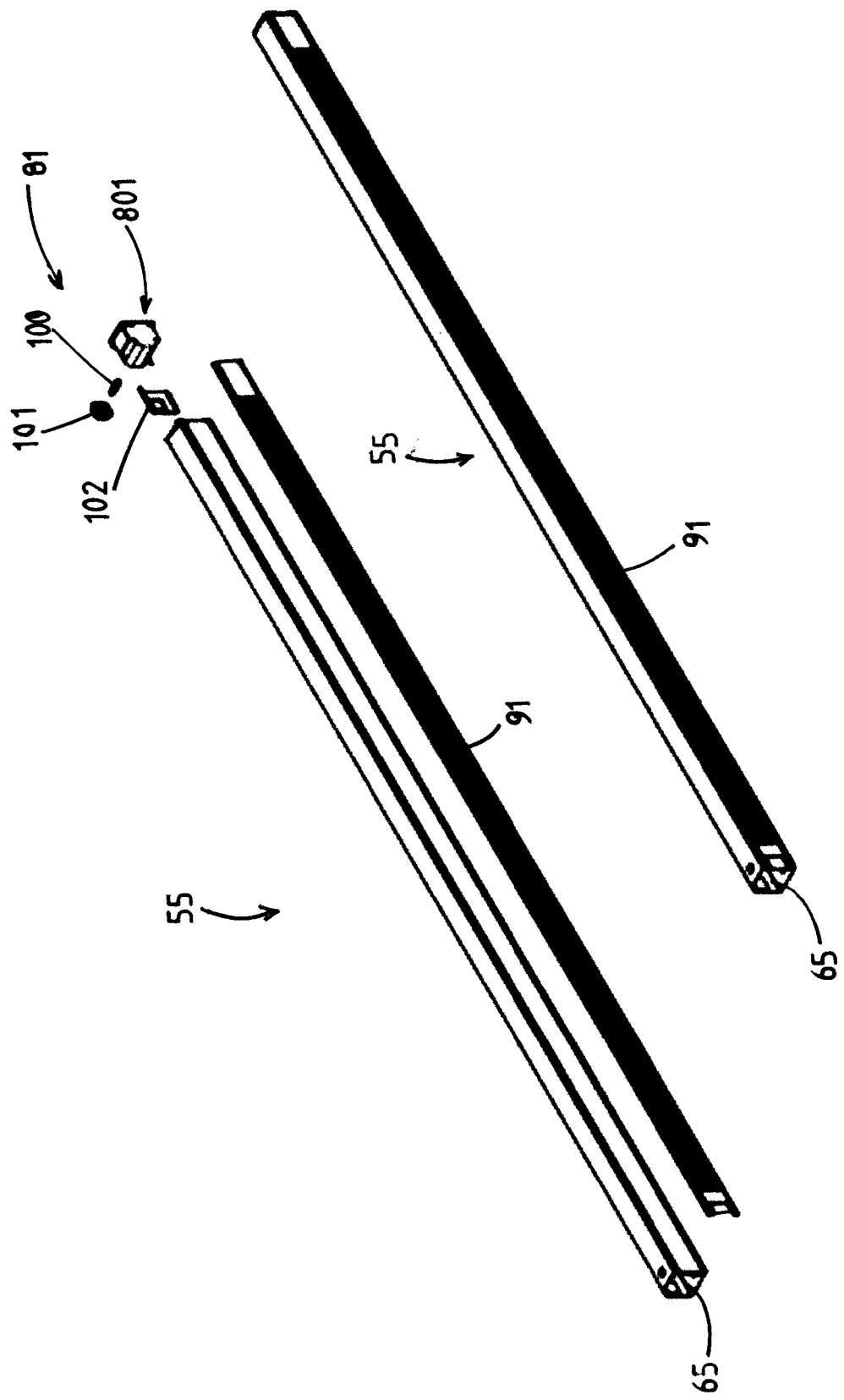
FIG. 51 illustrates a second extension member of the staff of FIG. 15.

In order to extend and retract the lower extension section from the upper section 51, a clamp assembly 62 is located at one end of the second elongated member 53. As shown in FIG. 20 clamp assemblies 60, 61 and 62 allow the lower extension members 54, 55 and 56 to be extended and retracted with respect to the upper section 51. The clamp assemblies 60, 61 and 62 in conjunction with shaft inserts 90, 91 and 92 interact to allow the lower extension members 54, 55 and 56 to be telescopically and releasably retracted and extended to numerous position combinations to suit the requirement of any rotary laser leveling system.

FIGS. 56 to 71 show the clamp assembly 60 in more detail. Clamp assemblies 61 and 62 are not shown as they are identical in configuration and shape with that of clamp assembly 60 and only differ in the size of the body 130 due to the different sectional sizes of the members 54, 55 and 56 which allow each member to be telescopically retracted and extended into the previous member for use and/or storage.

The clamp assembly 60 consists of a body 130 (FIGS. 58 to 63), a pivotally mounted lever 132 (FIGS. 64 to 68) which is mounted on pivot pin 133 (FIG. 69) which has a circular section 139. The pivot pin 133 is fixedly mounted into two apertures located inside the body 130 of the clamp assembly 60. The lever 132 is biased against springs 131 (FIG. 71) and 138 (FIG. 70), such that when a pressure is applied to the lower end 115 of lever 132 the lever pivots around the pivot pin 133 and against the biasing springs 131, 138 to allow the locking pin 116 to be removed from the shaft insert 92 to allow the lower extendable member or foot member 56 to be extended or retracted with respect to the second extension member 55. The lever 132 has a hole 136 through which the pivot pin 133 passes and therefore the lever pivots around the point 136 through which the pivot pin 133 is received.

Clamp assemblies 61 and 62 may not include the biasing springs 131, 138 in order to more easily retract end extend the lower extension members 55, 56. The lever arms 132 are designed such that upon extension the lever arm and the lever arm locking pin 116 will simply lock into place and due to the design of the locking pin 116 with a slight bevel on the underside will allow the respective extension member 55, 56 to retract more easily however it will still extend and lock into place.

The body 130 as shown in FIGS. 58 to 63 is constructed from a plastics material which is molded to form the required shape. However, the body 130 may be constructed from any suitable material and may form any shape dependent upon the section shape of the members 53, 54, 55 and 56. The body 130 is mounted at one end over an end of second extension member 55 and the other end receives the upper end of the lower extendable or foot member 56. The body 130 has a hollow interior 137 and locking clips 135 which locate and lock the body 130 to complementary apertures in the lower end of the second extension member 55.

The body 130 also includes apertures 134 located on the opposing side from the lever 132. The apertures 134 are designed to receive the end cap button 101 of the lower extendable or foot member 56 and therefore prevent the lower extendable member 56 from extending any further from the staff 50. It is basically a mechanical stop which when the end cap button 101 is depressed the lower extendable member 56 is able to be retracted into the second extension member 55. As is explained above the end cap buttons 101 on each end cap assembly 80, 81, 82 all perform the same function of preventing the respective member 54, 55 and 56 from extending beyond the allowed limit and therefore preventing any member from being inadvertently removed from the respective upper member.

As noted above each member 54, 55 and 56 have an insert 90, 91 and 92 respectively located on a side of each member 54, 55 and 56. The inserts 90, 91 and 92 are constructed in the form similar to that of a ladder with a number of bars or rungs projecting across between two winged sidepieces 112. It is the locking pin 116 on the lever 132 which releasably engages with the respective bars or rungs of the inserts 90, 91 and 92 which control the locking of the members 54, 55 and 56 in any number of extended, retracted or intermediate positions. As shown in FIGS. 51 to 55 and 79 to 83 each member 54, 55 have an insert 90, 91. The inserts 90, 91 have two winged sidepieces 112 on either side of the inserts 90, 91 which are retained in the respective members 54, 55 within the longitudinally extending slots 111 located on either side of one side of the members 54, 55. The first extension member 54 has a hollow shaft 110 and is constructed from aluminum with a substantially rectangular section. The second extension member 55 also has a hollow shaft 110 and is constructed from aluminum with a substantially rectangular section. However, the members 54, 55 could be constructed from any material and have any shape in section which would be suitable for the use of a measuring staff 50.

Figure 52:
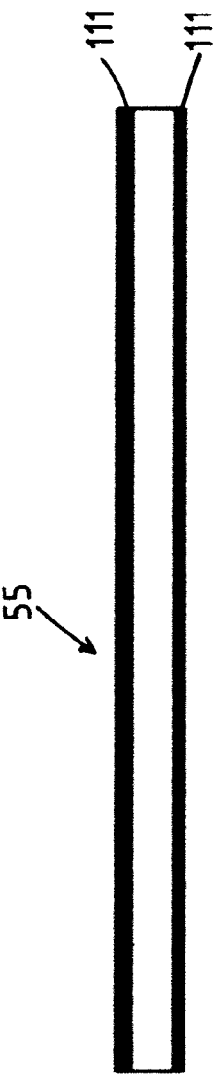
FIGS. 52 and 53 show an end view and a side view of the shaft of the second extension member of FIG. 51.
Figure 53:
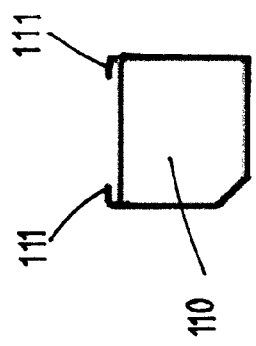
Figure 54:
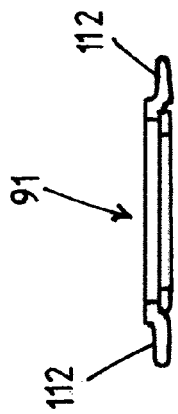
FIGS. 54 and 55 illustrate a front view and an end view of the shaft insert for the second extension member of FIG. 51.
Figure 55:
Figure 57:
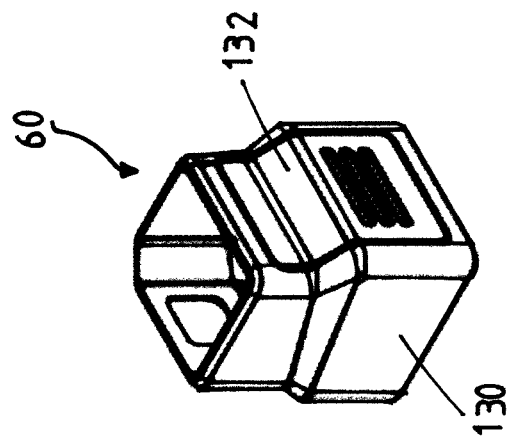
FIG. 57 illustrates an assembled view of the clamp assembly of FIG. 56.
Figure 56:
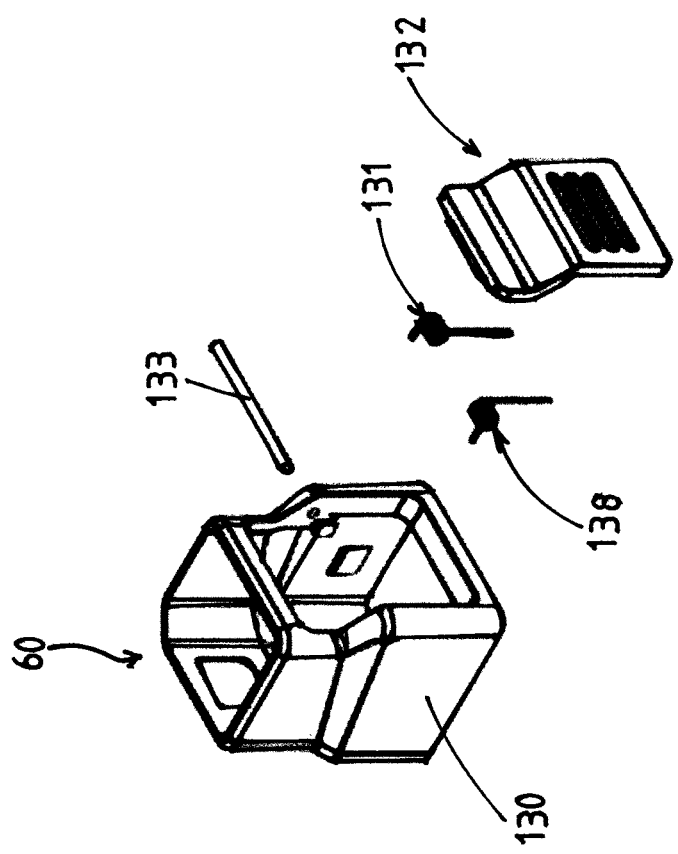
FIG. 56 illustrates an exploded view of the clamp assembly as would be attached to the lower end of the second extension member of FIG. 51.
Figure 79:
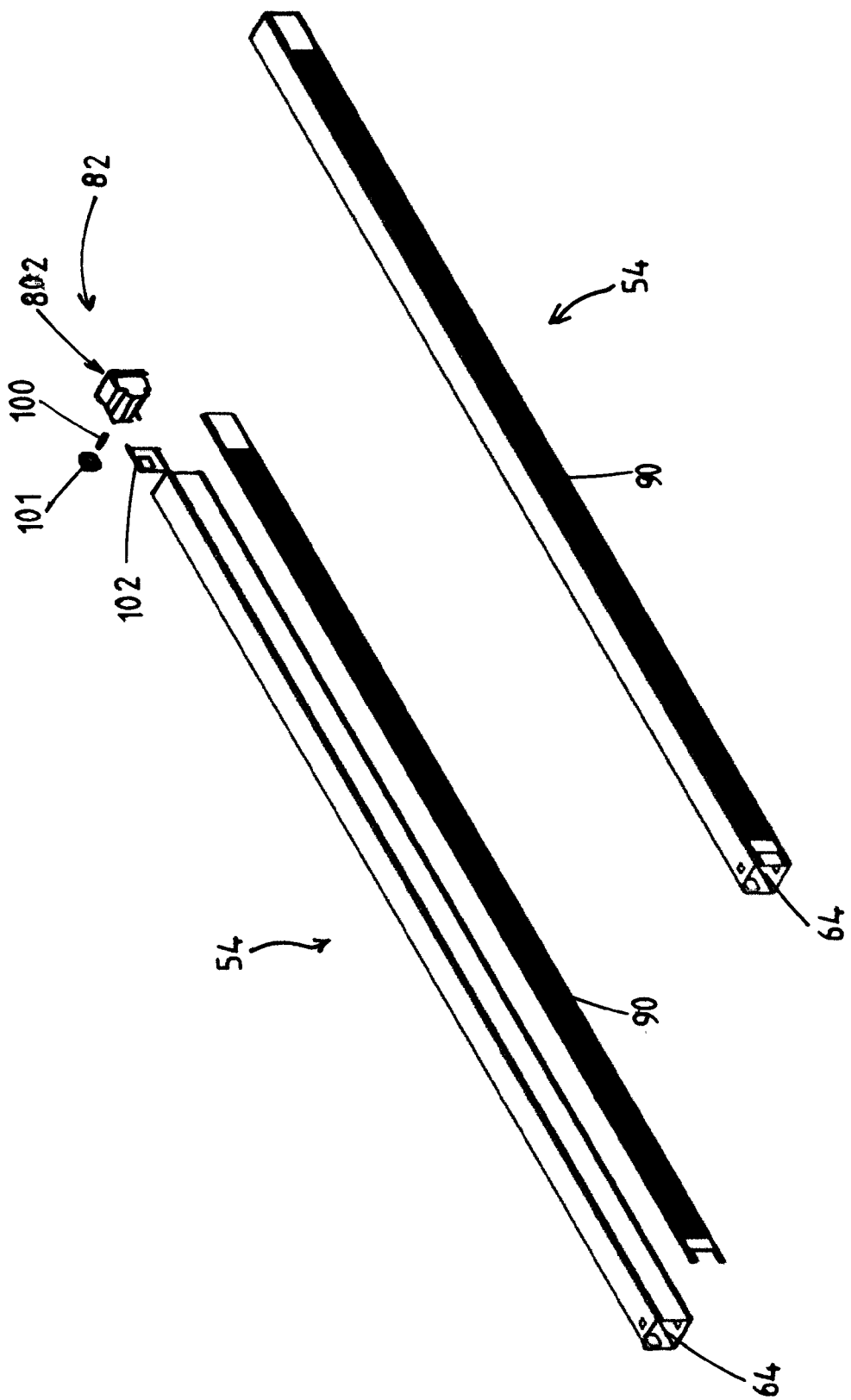
FIG. 79 illustrates a first extension member of the staff of FIG. 15.
Figure 91:
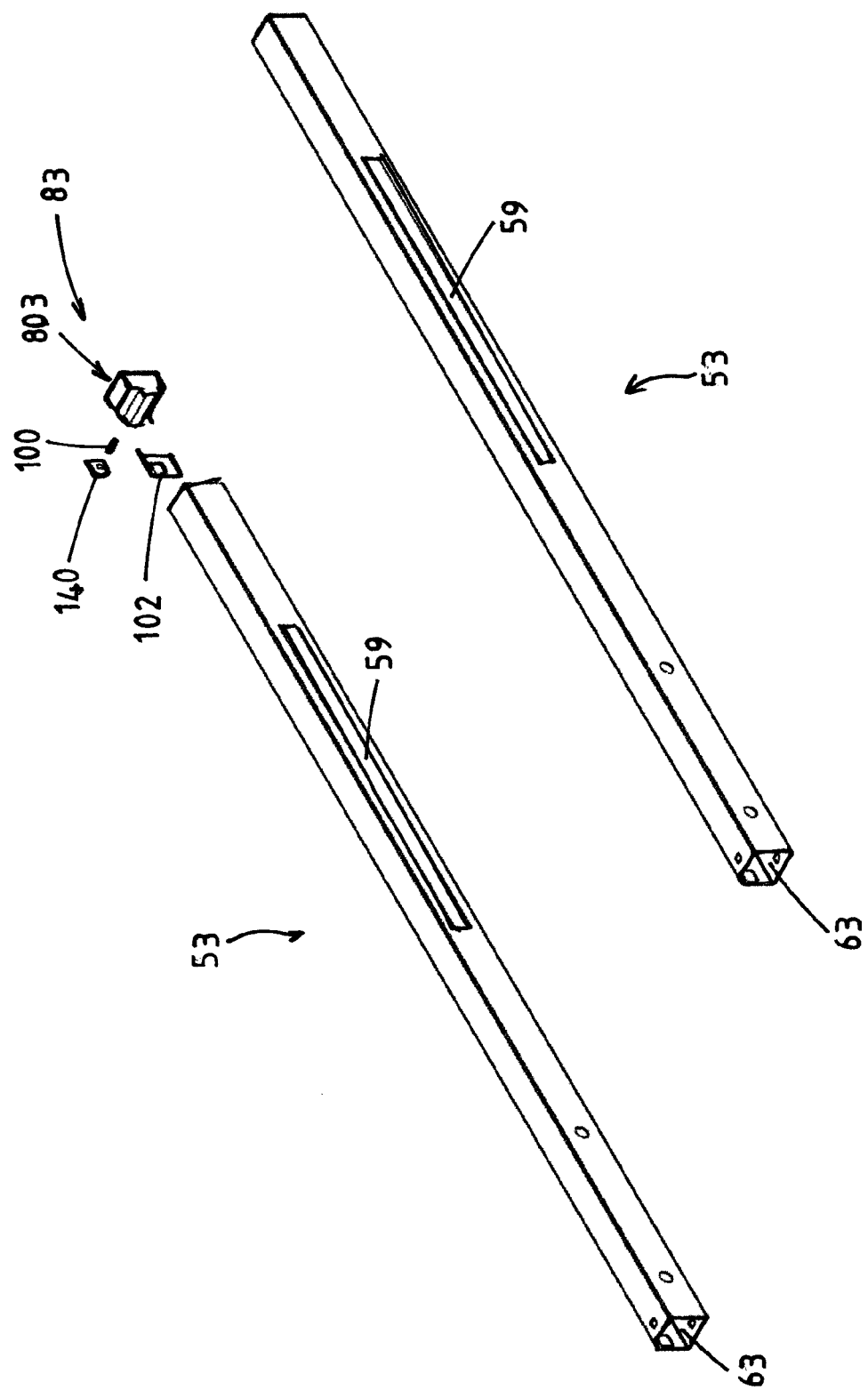
FIG. 91 illustrates a second elongated member of the staff of FIG. 15.
Figure 93:
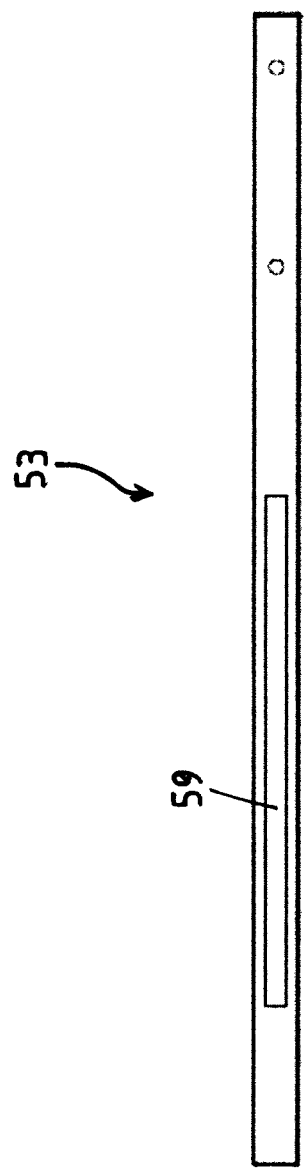
FIGS. 92 and 93 show an end view and a side view of the shaft of the second elongated member of FIG. 91.
Figure 92:
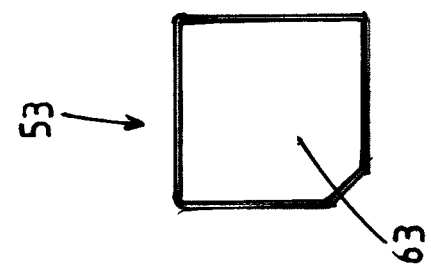
Figure 101:
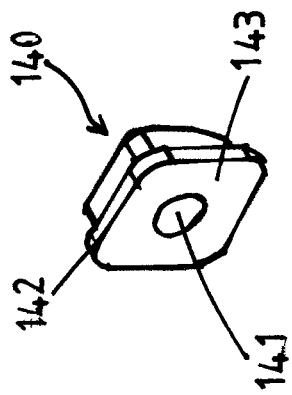
FIGS. 101 to 105 show an end cap button used in the upper end cap of the second elongated member where
Figure 104:
Figure 102:
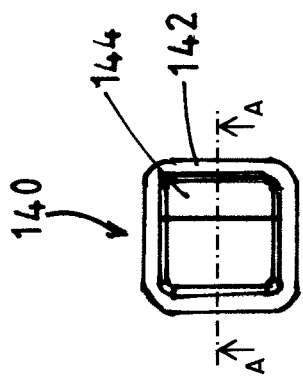
Figure 103:
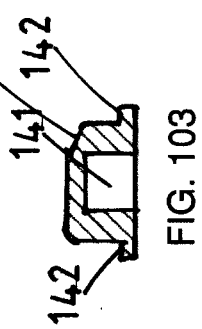
Figure 105:
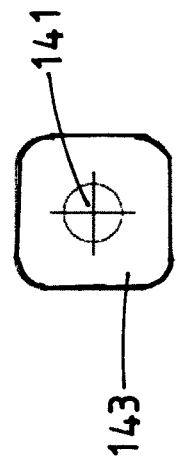
Figure 106:
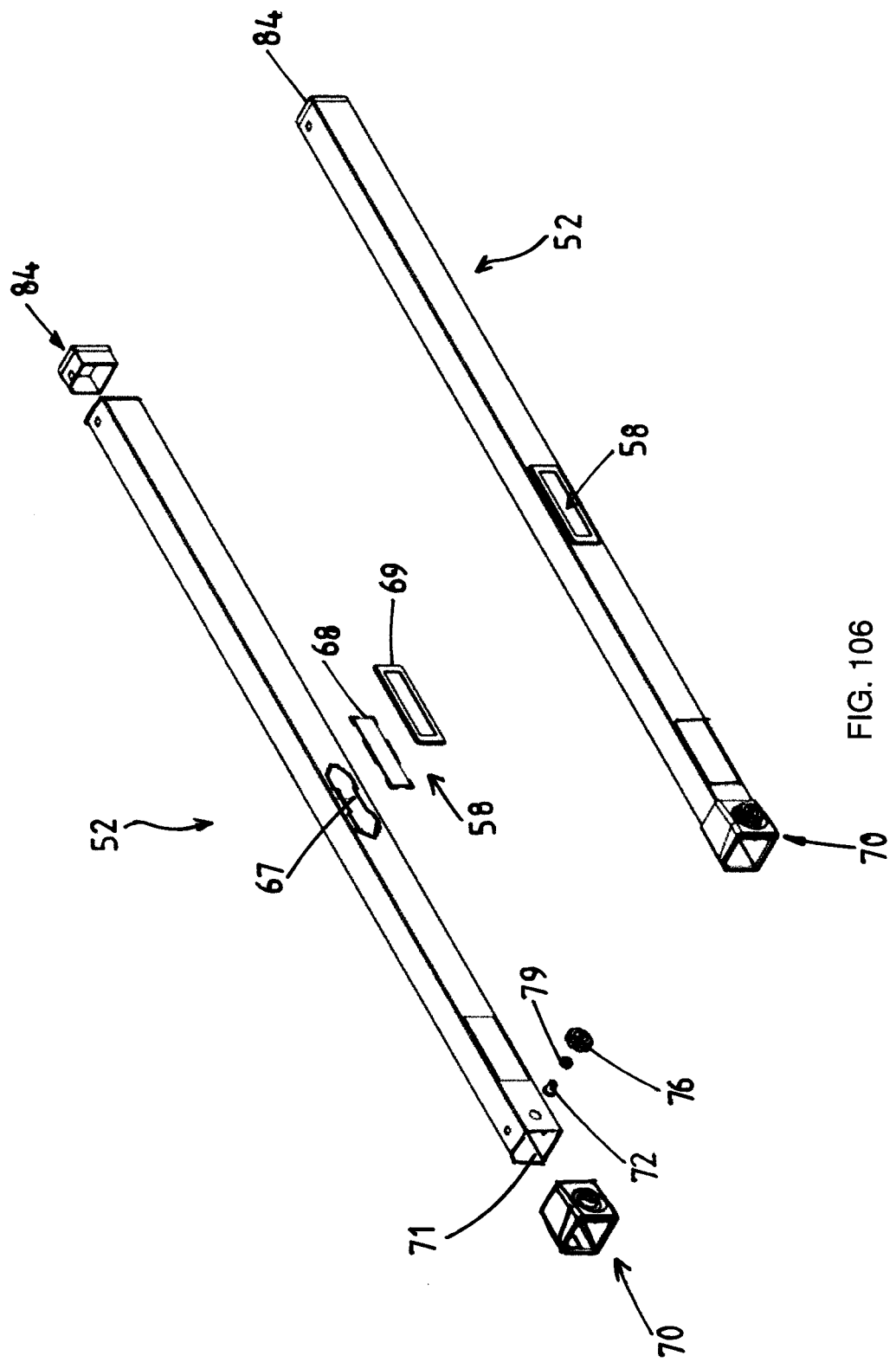
FIG. 106 illustrates a first elongated member of the staff of FIG. 15.

As shown in FIGS. 52 and 80 the first extension member 54 and the second extension member 55 are formed with a substantially hollow rectangular section and having openings 65, 64 at either end of the members 54, 55. At one corner of the section a chamfer at approximately 45 degrees is formed between two adjacent principal faces of the section of each member 54, 55. The chamfer extends substantially the entire length of the member 54, 55.

As shown in FIGS. 21 to 25 the insert 92 is located on a side of the lower extendable or foot member 56. The insert 92 has rungs or bars positioned at different locations such that the rungs or bars are located such that they provide a scale or calibration markings which are graduated at a plurality of block, brick or presto brick heights on the lower extension or foot member 56 to indicate required levels for brick or block laying for step downs in footings to suit the bricks or blocks being used.

As shown in FIGS. 21 to 25 the lower extension or foot member 56 has an insert 92. The insert 92 has two winged sidepieces 112 on either side of the insert 92 which are retained in the respective member 56 within the longitudinally extending slots 111 located on either side of one side of the member 56. The lower extension or foot member 56 has a hollow shaft 110 and is constructed from aluminum with a substantially rectangular section. However as above, the member 56 could be constructed from any material and have any shape in section which would be suitable for the use of a measuring staff 50.

Also, as shown in FIG. 22 the lower extension or foot member 56 is formed with a substantially hollow rectangular section and having openings 66 at either end of the member 56. At one corner of the section a chamfer at approximately 45 degrees is formed between two adjacent principal faces of the section of the member 56. The chamfer extends substantially the entire length of the member 56.

As shown in FIGS. 26 to 31 attached at the lower end of the lower extension member 56 is a foot 57. The foot 57 is attached to the staff 50 by a fastener through a locating thread 121 in the lower end cap 85. The end cap 85 has an outer edge 120 which extends around the periphery of an end of the end cap 85. A body section which protrudes into the end 66 of the lower extension or foot member 56 has locking clips 122 which lock into complementary apertures found in opposing surfaces in the lower section of the lower extension or foot member 56. The end cap 85 closes off the lower end of the lower extension or foot member 56 and subsequently the lower extendable section of the staff 50.

End cap assemblies 80, 81 and 82 are respectively mounted in the upper ends of members 56, 55 and 54. End cap assembly 80 is illustrated in FIGS. 32 to 50 and comprises an end cap 800 (FIGS. 32 to 38), an end cap lid 102 (FIGS. 39 to 44) with an end cap button 101 (FIGS. 45 to 49) and an end cap spring 100 (FIG. 50).

The end cap button 101 is mounted in the end cap assemblies 80, 81 and 82 whereas end cap button 140 is mounted in end cap assembly 83 and is described in further detail below. The end cap buttons 101, 140 and springs 100 are used so that when extending or retracting the respective members 56, 55, 54 or 53 the combination of the spring 100 and end cap button 101, 140 applies a resistance pressure to oppose or retard the motion of the member by applying pressure to the inside of the next upper member. For example, end cap button 101 in end cap assembly 80 applies pressure to the inside of the second extendable member 55 to oppose or retard the motion of the lower extendable member or foot member 56. Likewise, end cap button 101 in end cap assembly 81 applies pressure to the inside of the first extendable member 54 to oppose or retard motion of the second extendable member 55. As described previously the end cap button 101, 140 allow the respective member 56, 55, 54 or 53 to extend until the respective end cap button is received into one of the apertures 134 in the body 130 of the clamp assemblies 60, 61 or 62. Likewise to retract the member from the extended position the end cap button 101 must be pressed to release the respective section. This is not the case for the end cap button 140 located in the end of the second elongated member 53 and is described further below.

The end cap 800 includes projections 128 on either side and at one end of the end cap 800. The projections 128 connect with apertures located in the upper end of the lower extension or foot member 56 to releasably secure the end cap assembly 80 into the end of the lower extension member 56. The spring 100 is placed over a projection 126 or spring retainer 126 with the other end of the spring 100 being located within the circular raised section 105 of the end cap button 101. The end cap button 101 projects through an aperture 103 in the end cap lid 102 and extends through an aperture in the lower extension member 56. The end cap lid 102 has a section 104 which is raised at an angle from the remainder of the end cap lid 102. This section 104 is placed against the inside of the chamfer which is formed at approximately 45 degrees between two adjacent principal faces of the section of the lower extension member 56. The end cap button 101 comprises an edge 106 which extends around the periphery of the end cap button 101 such that when the end cap button 101 is located within the aperture 103 of the end cap lid 102 the edge 106 prevents the end cap button 101 from pulling through the end cap lid 102 by surrounding the aperture 103.

A slightly different designed end cap button 140 as shown in FIGS. 101 to 105 is located in the end cap lid 102 of the end cap assembly 83. The spring 100 is placed over a projection 126 or spring retainer 126 with the other end of the spring 100 being located within the circular section 141 of the end cap button 140. The end cap button 140 projects through an aperture 103 in the end cap lid 102 and extends through an aperture in the second elongated member 53. The end cap button 140 comprises an edge 142 which extends around the periphery of the end cap button 140 such that when the end cap button 140 is located within the aperture 103 of the end cap lid 102 the edge 142 prevents the end cap button 140 from pulling through the end cap lid 102 by surrounding the aperture 103. The end cap button 140 also has a beveled or sloped edge 144 which is designed to allow the second elongated member 53 to normally extend from the first elongated member 52 however by the application of a slight pressure force in a downward direction on the first elongated member 52 allows the second elongated member to be easily retracted into the first elongated member 52 without having to press the end cap button 140. Unlike end cap button 101 there is no need to depress end cap button 140 to release and retract the second elongated member 53.

When the respective members 56, 55, 54 and 53 are extended and reach a point which is the maximum length which that member is allowed to extend relative to the next member up the measurement staff 50 the end cap button 101 with the button surface 107 reaches a point or another aperture which when the end cap button face 107 is located within this aperture the spring 100 expands or projects the end cap button 101 and the end cap button face 107 into the aperture to prevent the member from extending any further when the member reaches the point of maximum extension of the respective member.

Each end cap assembly 80 (FIGS. 32 to 50), 81 (FIGS. 72 to 78), 82 (FIGS. 84 to 90) and 83 (FIGS. 94 to 100) comprise the same components as described above for end cap 80. Therefore a description of the particular components is not required. End cap 80 is mounted into the top end of the lower extension or foot member 56. End cap 81 is mounted into the top end of the second extension member 55. End cap 82 is mounted into the top end of the first extension member 54. End cap 83 is mounted into the top end of the second elongated member 53. As like the members 52, 53, 54, 55 and 56 the shape of the end cap assemblies is dependent upon the section shape of the members 52, 53, 54, 55 and 56.

All end caps (800, 801, 802, 803), clamp assemblies (60, 61, 62) or shaft collar (70) may be constructed from a plastics material and are typically in the shape of the respective members (52, 53, 54, 55, 56). However as above the components could be constructed from any material and have any shape in section which would be suitable for the use of a measuring staff 50.

The staffs of the present invention allows for the determination of all the measurement height of the slab from curb R.L., cut and fill heights to determine depth of cut or fill and depth of footings. Preparing of sand levels for the underside of a floor slab can be calculated at the office and a chart with all these dimensions recorded can be given to the site foreman who can give these to the concreter and excavator for the required site preparation for a building.

In order to perform the task of a standard measuring staff, measuring scales have been placed on at least one side of each member 52, 53, 54, 55 and 56. The only exception is that the scale on the lower extendable member or foot member 56 may include a scale or calibration markings which are graduated at a plurality of block, brick or presto brick heights to indicate required levels for brick or block laying for step downs in footings to suit the bricks or blocks being used.

The staffs 10, 31 and 50 may be used in many other applications such as in laying pipes, digging canals, checking if there are variations in the finished floor slab, placing concrete, measuring stepdowns for wet areas and garage slabs and preparing levels for a contour survey plan. The staffs 10, 31 and 50 however can also be used in many other applications.

The members of the staffs of the invention are preferably aluminum extrusions of a square or rectangular cross section however the staff may be constructed of other materials. The staffs may also be used with any form of laser or other level such as optical levels which use a sighting marker which can be positioned along and fixed to the staff 10, 31 or 50 in a similar manner to the positioning and fixing of the laser detector 30.

The terms "comprising" or "comprises" as used throughout the specification and claims are taken to specify the presence of the stated features, integers and components referred to but not preclude the presence or addition of one or more other feature/s, integer/s, component/s or group thereof.

While the above has been given by way of illustrative embodiment of the invention, all such variations and modifications thereto as would be apparent to persons skilled in the art are deemed to fall within the broad scope and ambit of the invention as herein defined in the appended claims.

I claim:

1. A measuring staff for use with a laser leveling system including a laser detector for detecting a laser beam, said staff comprising:
    an upper section having a first elongated member and a second elongated member, said second elongated member capable of being extended and retracted relative to the first elongated member, wherein said laser detector is adapted to be located along said first elongated member and fixed thereto in a position aligned in use with said laser beam to define a datum level;
    a clamping means located on the first elongated member for selectively clamping the second elongate member in an extended or retracted position such that the clamping means locks the second elongate member against movement relative to the first elongate member;
    a graduated scale on said second elongated member and extending longitudinally therealong;
    an indicating means located on said first elongated member and adapted to display the graduated scale on said second elongated member whereby to provide, upon extension or retraction of said second elongated member relative to said first elongated member, measurements on said graduated scale of levels above or below said datum level; and
    a lower extension section extendable from and releasably engageable with said upper section.

2. A measuring staff as claimed in claim 1 wherein first and second elongated members are telescopically engaged with each other.

3. A measuring staff as claimed in claim 2 wherein said second member is extendable from and retractable into said first member.

4. A measuring staff as claimed in claim 1 wherein said first and second elongated members are adapted to be moved relative to each other to position said indicating means in use to display a central or zero position along said graduated scale on said second elongated member when said laser detector is aligned with said datum plane and wherein said second elongated member is moved in use in opposite directions from said central or zero position along said graduated scale upon extension or retraction of said second elongated member relative to said first elongated member to provide said measurements from said central or zero position.

5. A measuring staff as claimed in claim 4 wherein said graduated scale comprises a pair of scales extending above and below said central or zero position and wherein said scales of said pair of scales are marked to provide readings which increase linearly above and below said central or zero position.

6. A measuring staff as claimed in claim 1, further including a resistance means located in an upper end of said second elongated member to oppose or retard motion of the second elongated member when it is extended or retracted with reference to the first elongated member.

7. A measuring staff as claimed in claim 6, wherein said resistance means comprises a resilient means, wherein said resilient means applies a pressure against an inner surface of said first elongated member to oppose or retard the motion of the second elongated member.

8. A measuring staff as claimed in claim 1, wherein said clamping means includes a collar extending over an end of said first elongated member and adapted to guide said second elongated member to extend and retract telescopically with respect to the first elongated member.

9. A measuring staff as claimed in claim 8, wherein said clamping means further includes a locking pin which is biased towards and away from said second elongated member by an actuator means, said locking pin locks the second elongate member against movement relative to the first elongate member.

10. A measuring staff as claimed in claim 9 wherein said biasing means comprises a spring located between said locking pin and said actuator means.

11. A measuring staff as claimed in claim 1 wherein said lower extension section is telescopically extendable from a lower end of said second member.

12. A measuring staff as claimed in claim 11, wherein said lower extension section further includes at least one extension member, whereby said at least one extension member includes a longitudinally extending insert which is adapted to allow the lower extension section to be releasably engaged with said upper section.

13. A measuring staff as claimed in claim 12, wherein an end of said second elongated member includes a releasably engageable clamp assembly which is adapted to releasably engage said longitudinally extending insert of said at least one extension member to allow said extension member to extend and retract relative to said second elongated member.

14. A measuring staff as claimed in claim 13, wherein said at least one extension member further includes a resistance means located in an upper end of said at least one extension member to oppose or retard motion of the at least one extension member when it is extended or retracted with reference to the upper section.

15. A measuring staff as claimed in claim 14, wherein said resistance means comprises a resilient means, wherein said resilient means applies a pressure against an inner surface of said second elongated member to oppose or retard the motion of the at least one extension member.

16. A measuring staff as claimed in claim 13 wherein said releasably engageable clamp includes a biased lever which pivotally engages said longitudinally extending insert to allow said extension member to extend and retract relative to said second elongated member.

17. A measuring staff as claimed in claim 1, wherein said lower extension section includes three extension members, whereby each said extension member includes a longitudinally extending insert which is adapted to allow each extension member to be releasably engaged with another extension member or said second elongated member to allow each extension member to extend and retract relative to another extension member or relative to said second elongated member.

18. A measuring staff as claimed in claim 17, wherein at least one of said three extension members includes an elongated extendable or retractable foot, said foot being marked with a plurality of brick or block heights.

19. A measuring staff as claimed in claim 18 wherein said foot is telescopically engaged with said first or second elongated member.

20. A measuring staff for use with a laser leveling system including a laser detector for detecting a laser beam, said staff comprising
an upper section having a first elongated member and
a second elongated member extendable and retractable relative to said first elongated member,
means for urging said second elongated member towards an extended position relative to said first elongated member and opposing movement of said second elongated member to a retracted position relative to said first elongated member,
means for selectively locking said first member to said second member,
said laser detector being adapted to be located along said first member and fixed thereto in a position aligned in use with said laser beam to define a datum level,
a graduated scale on said first member and extending longitudinally therealong,
indicating means movable with said second member and adapted to cooperate with said graduated scale whereby to provide, upon extension or retraction of said second elongated member relative to said first elongated member, measurements on said graduated scale of levels above or below said datum level, and
a lower extension section extendable from and selectively lockable to said upper section, said lower extension section including a scale for indicating the extension of said lower extension section relative to said upper section.

21. A measuring staff as claimed in claim 20 wherein said urging means comprises resilient means.

22. A measuring staff as claimed in claim 21 wherein first and second elongated members are telescopically engaged with each other and wherein said resilient means comprises a spring between the first and second elongated members.

23. A laser leveling system comprising a measuring staff and a laser detector for detecting a laser beam, said staff comprising
an upper section having a first elongated member and
a second elongated member extendable and retractable relative to said first elongated member,
means for urging said second elongated member towards an extended position relative to said first elongated member and opposing movement of said second elongated member to a retracted position relative to said first elongated member,
means for selectively locking said first member to said second member,
means for mounting said laser detector in a fixed position along said first member in which it is aligned in use with said laser beam to define a datum level,
a graduated scale on said first member and extending longitudinally therealong, indicating means movable with said second member and adapted to cooperate with said graduated scale whereby to provide, upon extension or retraction of said second elongated member relative to said first elongated member, measurements on said graduated scale of levels above or below said datum level, and
a lower extension section extendable from and selectively lockable to said upper section, said lower extension section including a scale for indicating the extension of said lower extension section relative to said upper section.

* * * * *